United States Patent Office 2,708,506  
Patented May 17, 1955

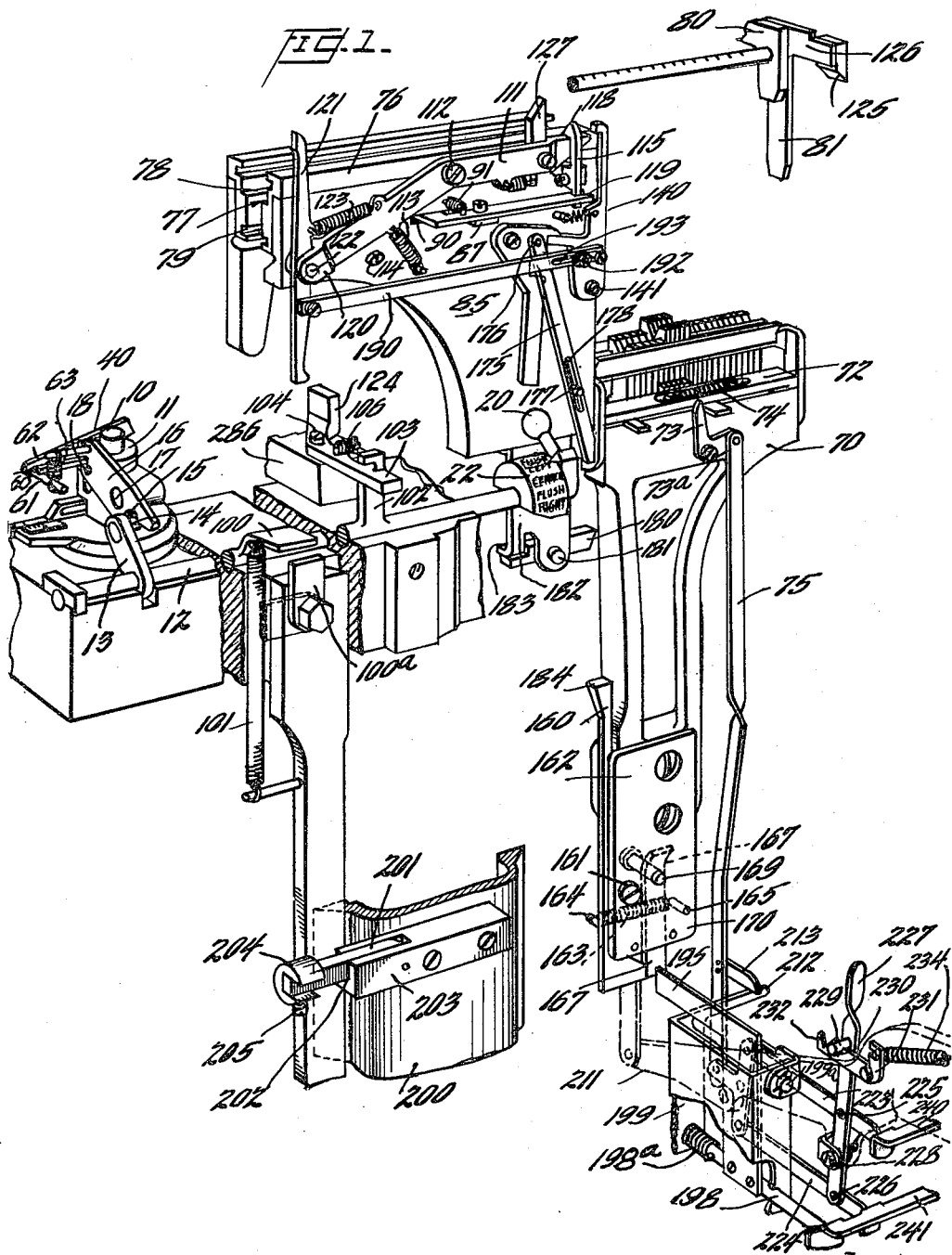

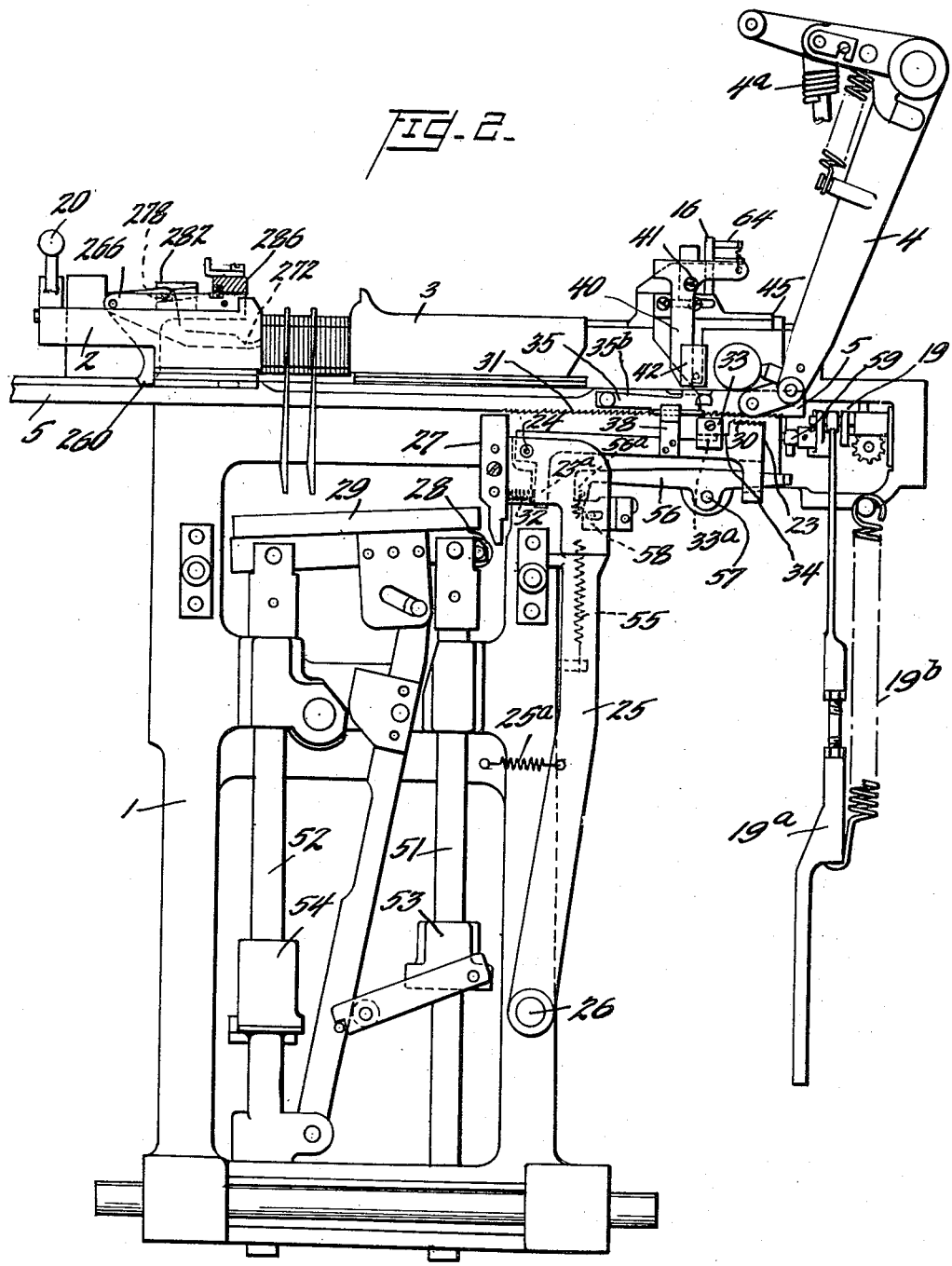

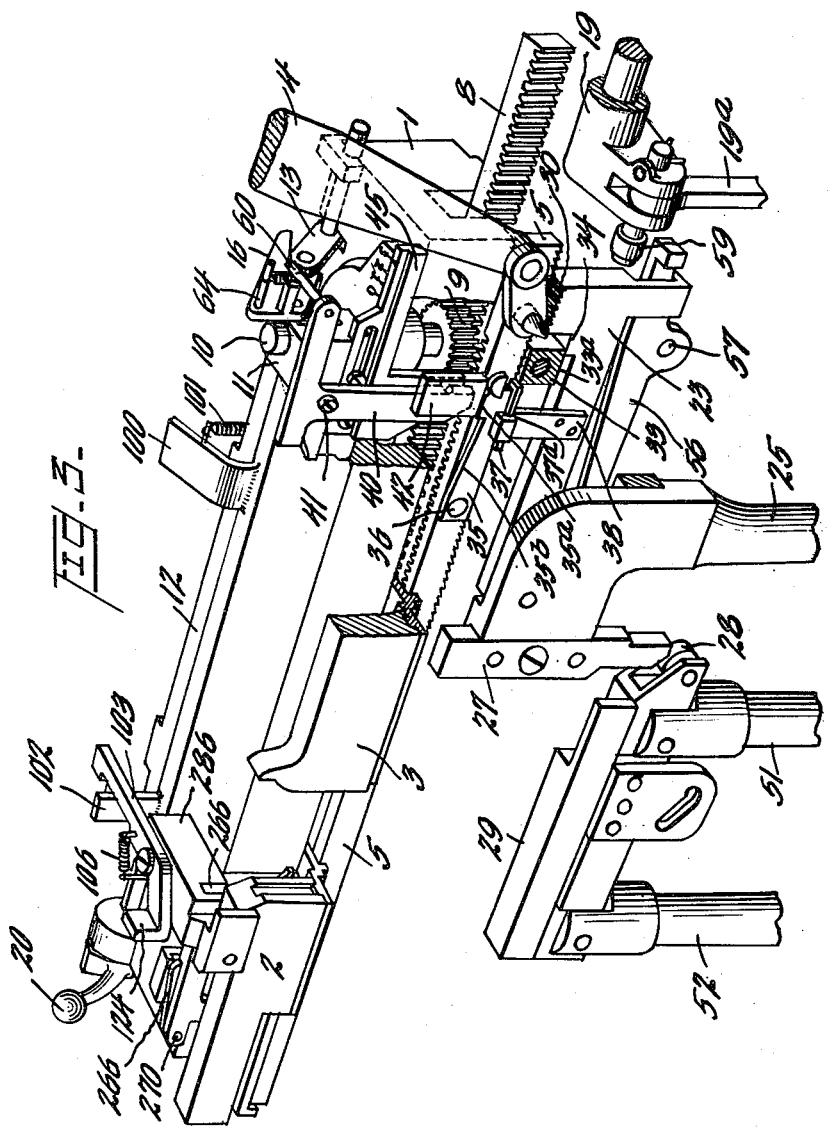

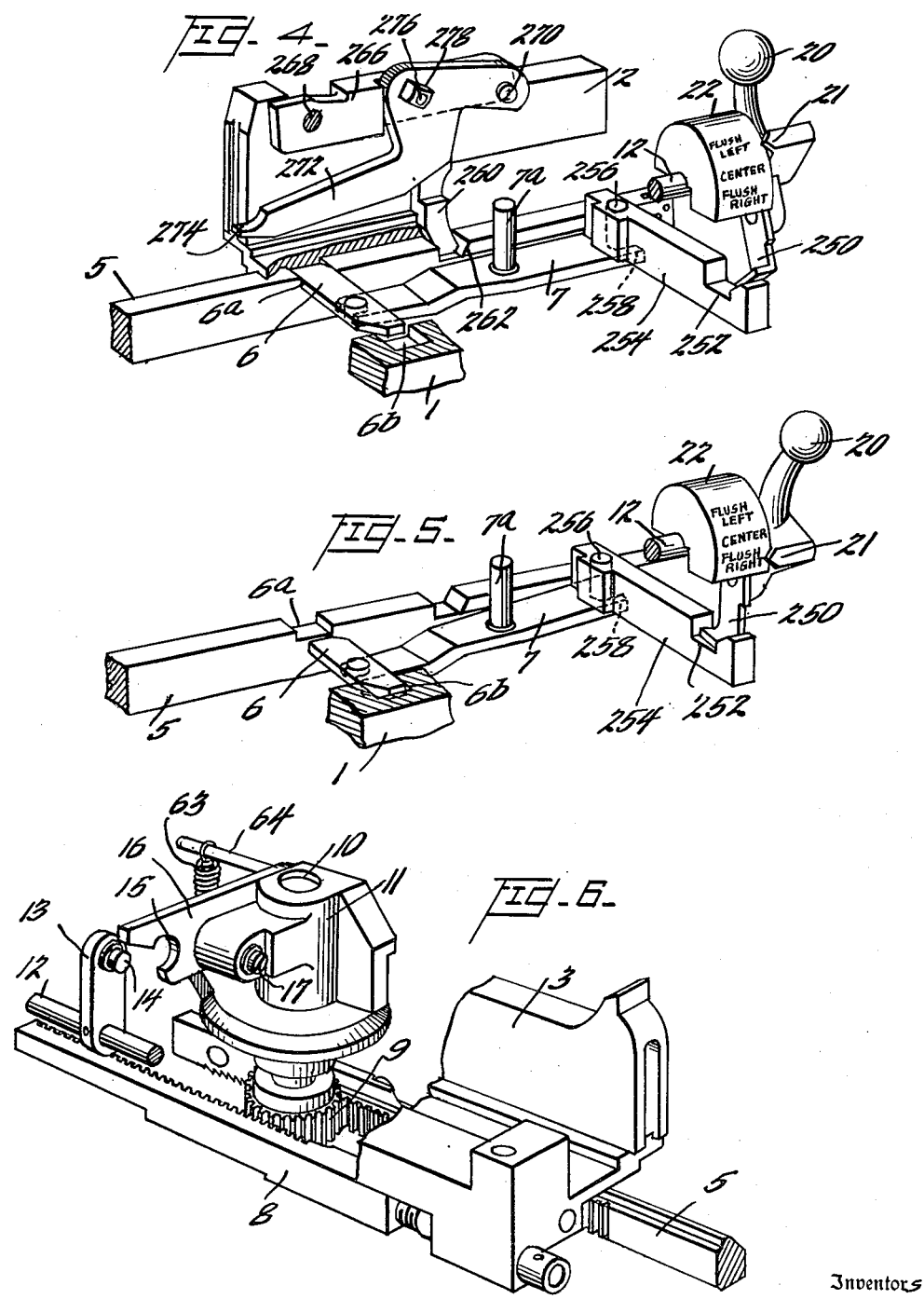

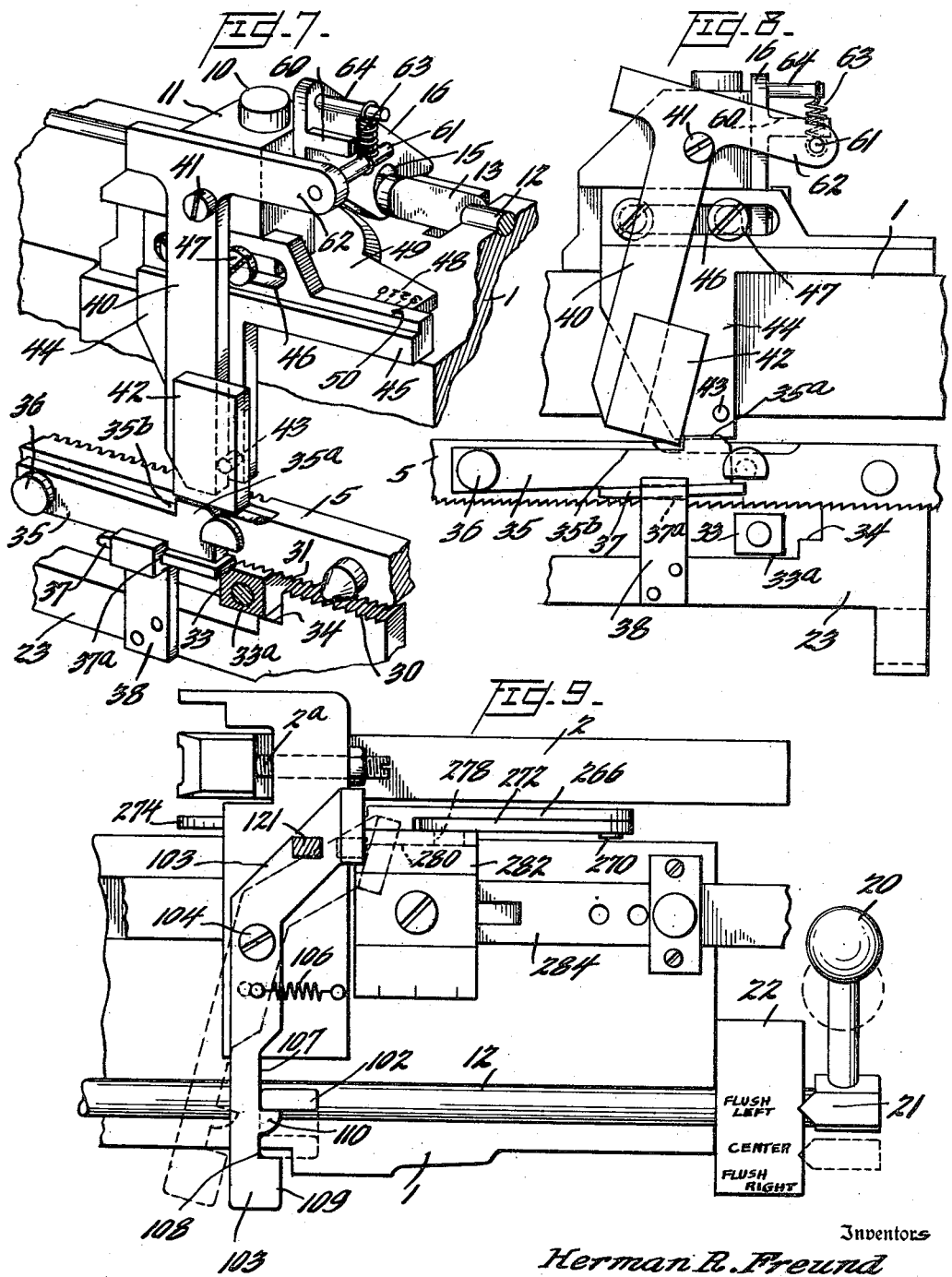

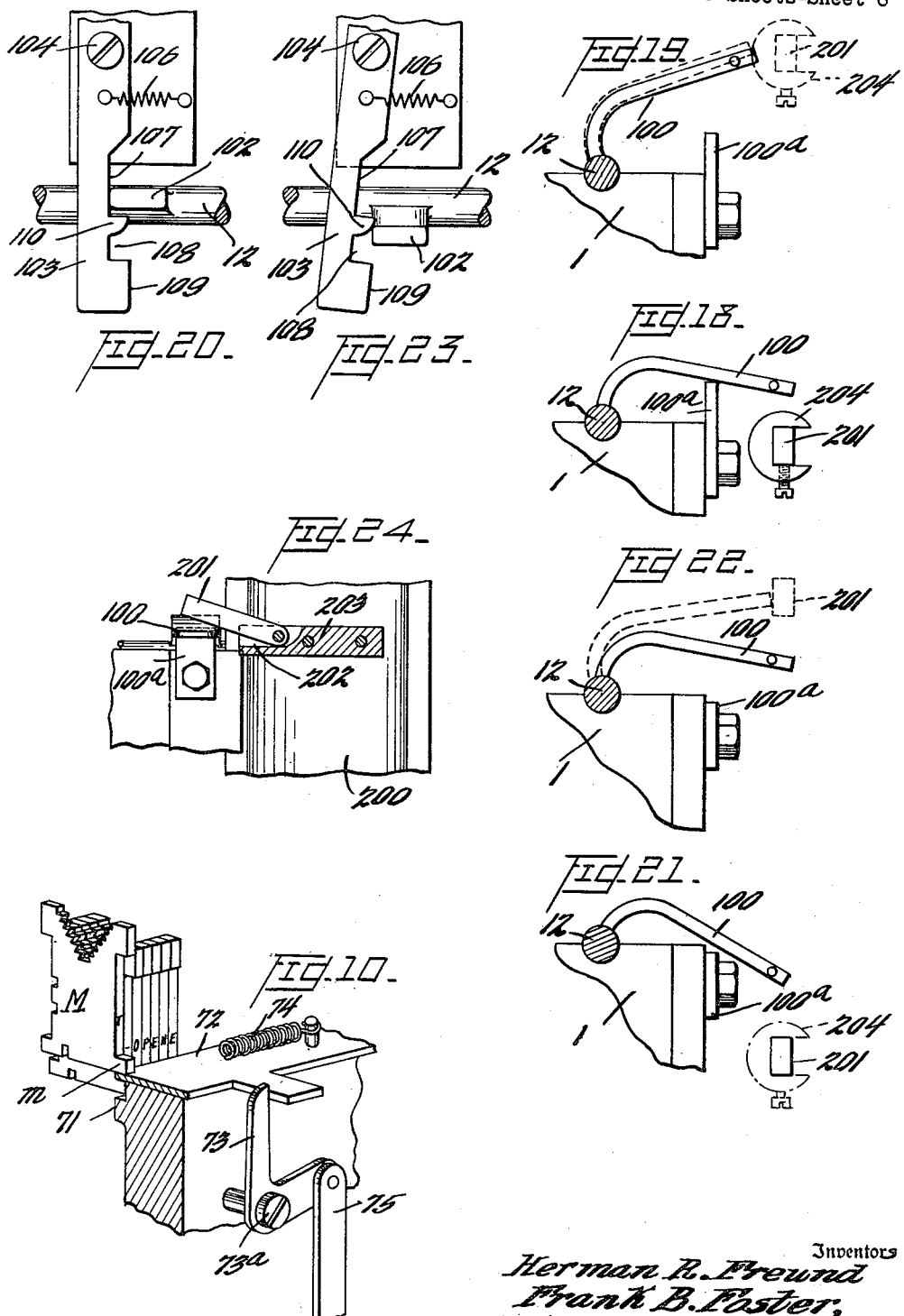

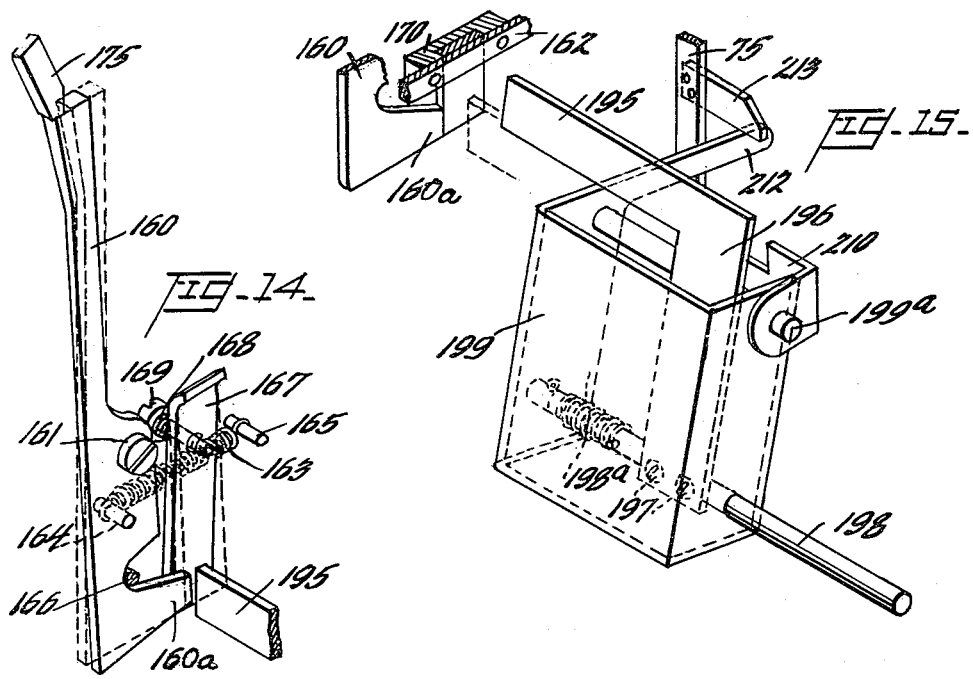
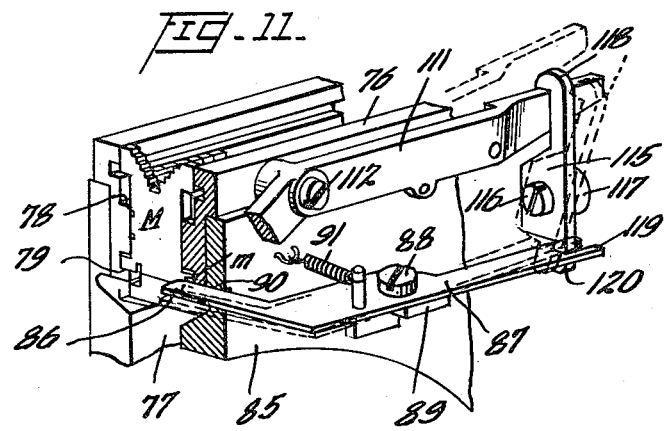

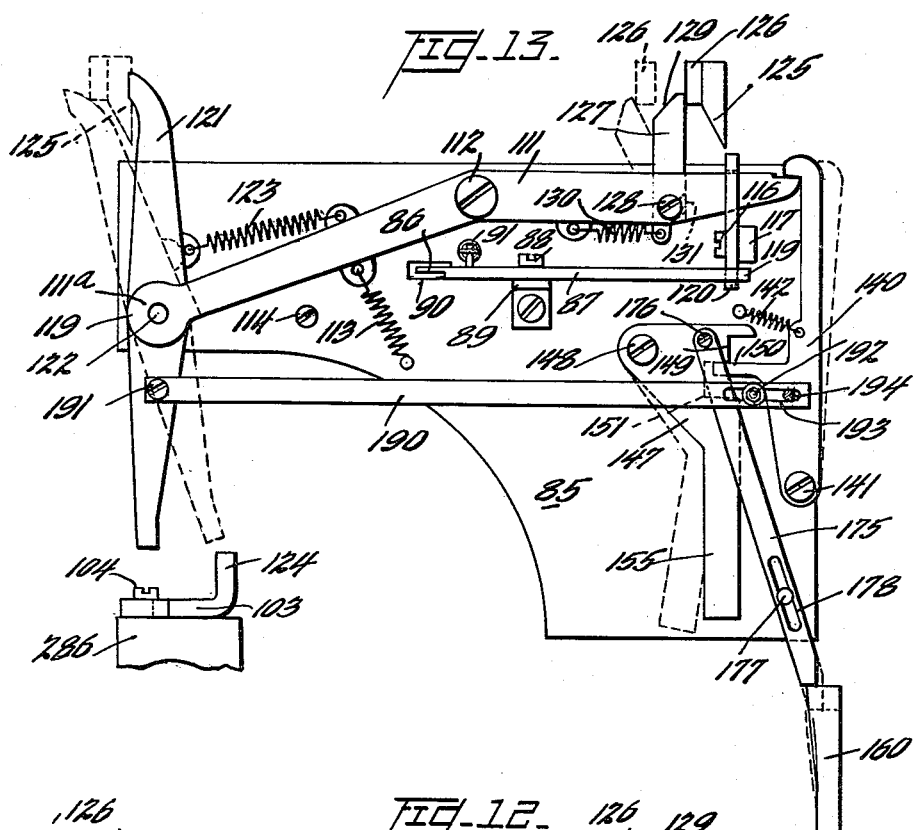

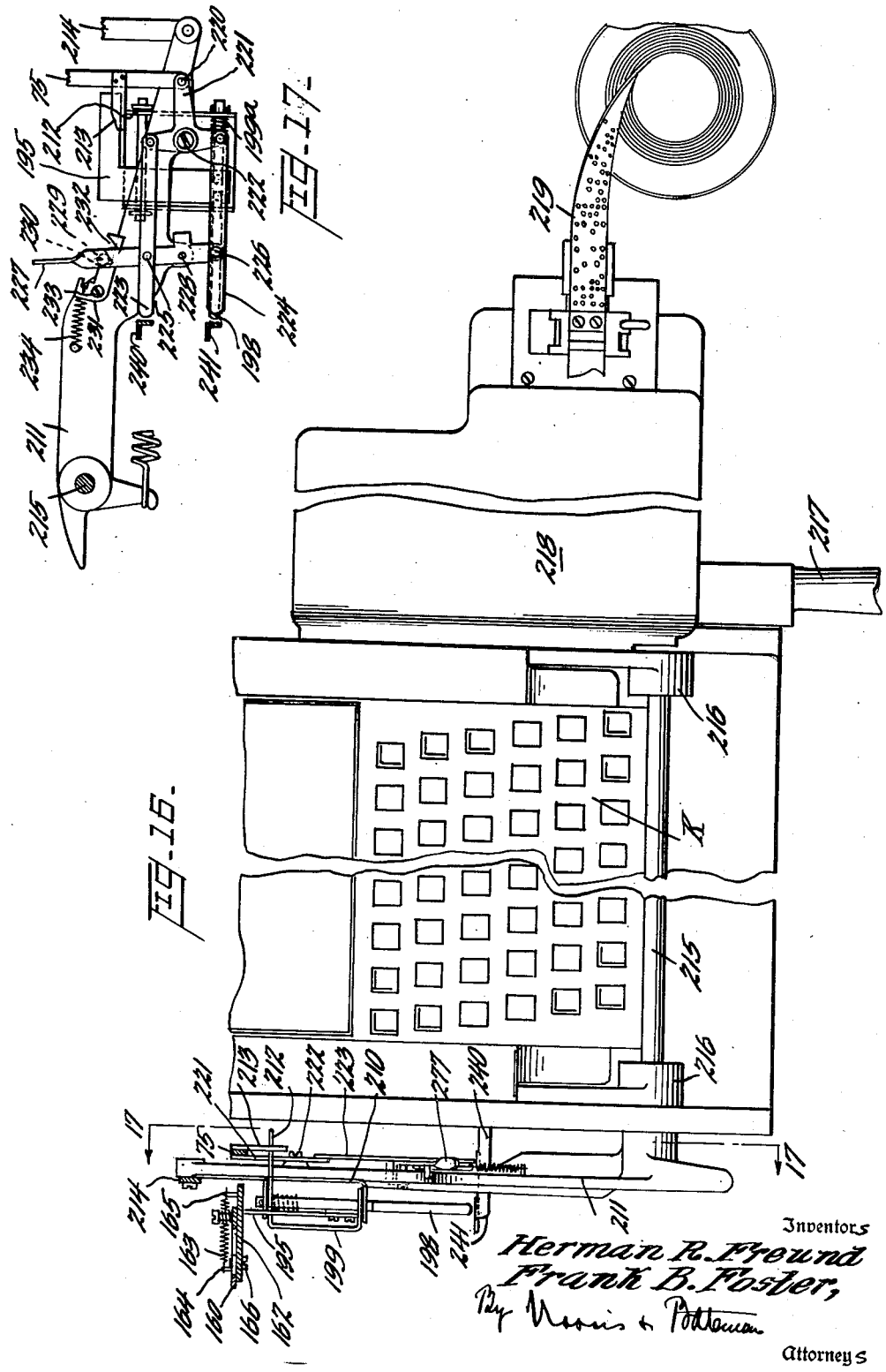

2,708,506

AUTOMATIC QUADDING AND CENTERING MECHANISM FOR TYPOGRAPHICAL MACHINES

Herman R. Freund, Brooklyn, and Frank B. Foster, New York, N. Y., assignors to Intertype Corporation, Brooklyn, N. Y.

Application June 7, 1951, Serial No. 230,326

32 Claims. (Cl. 199—18)

The present invention relates to improvements in typographical machines of the well known class in which character bearing matrices stored in a magazine are released therefrom under control of a keyboard and are assembled in composed lines which are clamped between a pair of vise jaws in front of a mold for the casting of type bars or slugs therefrom or for the production of other matter for printing from the composed matrix lines, and it relates more particularly to mechanism used generally on machines of this class for quadding composed matrix lines at either end and for centering the lines to meet the requirements in the composition of typographical matter, the present invention being an improvement upon the quadding and centering mechanisms disclosed in United States Letters Patents Nos. 1,964,695, dated June 26, 1934, 1,970,527, dated August 14, 1934, and 2,081,866, dated May 25, 1937.

A primary object of the present invention is to provide relatively simple and efficient means for automatically rendering quadding and centering mechanism of the kind hereinbefore referred to operable for quadding matrix lines at either end, or for centering matrix lines composed with or without expansible spacebands.

A more particular object of the invention is to provide means controlled by a composed matrix line as the line is advanced toward the vise jaws for automatically rendering the quadding and centering mechanism operable for quadding or centering.

Another object of the invention is to provide means responsive to an element of a composed matrix line for automatically actuating means which renders the quadding and centering mechanism operable for quadding or centering the matrix line.

Another object of the invention is to provide means controlled either manually or by a perforated tape mechanism for assembling in the matrix line during its composition a matrix line element which automatically renders the mechanism operable to center a matrix line.

A more particular object of the invention is to provide means responsive to the presence of a matrix assembled in raised position in a composed matrix line for automatically rendering the mechanism operable to center the matrix line.

Another object of the invention is to provide a device for selectively rendering the mechanism inoperable to center a matrix line in response to the presence of one or more matrices in raised position in a matrix line, thereby enabling matrix lines composed to full line measure or column width and in which some or all of the matrices are assembled at an upper level, to be clamped between the vise jaws at full line measure or column width, either with or without centering, as desired.

A further object of the invention is to provide means, applicable to quadding and centering mechanism embodying a device settable selectively to control the amount of spread or expansion of a matrix line during justification, and to automatically quad at one end a matrix line which is shorter than a given line measure or column width by an amount predetermined by such settable device, for automatically rendering such settable device ineffective and for rendering the mechanism operable to center a line of any length less than full line measure or column width.

To these and other ends, the invention consists in certain improvements and combinations and arrangements of parts, all of which will be hereinafter described in detail, the features of novelty being pointed out more particularly in the claims at the end of this specification.

In the accompanying drawings:

Figure 1 is a perspective view, showing the automatic control means applied to the quadding and centering mechanism of a line casting machine.

Figure 2 is a rear elevation of the vise jaw operating and controlling mechanism and the justification mechanism of the line casting machine to which the invention is shown applied.

Figure 3 is a perspective view, showing the quadding and centering mechanism for the vise jaws, and a line spread control device for the right hand vise jaw.

Figure 4 is a perspective view, showing the right hand vise jaw bolted to the jaw closing rack bar.

Figure 5 is a perspective view, showing the bolt for the right hand vise jaw retracted from engagement with the jaw closing rack bar and locked to the vise frame.

Figure 6 is a perspective view showing the means for controlling the pinion which couples together the jaw closing rack bars.

Figure 7 is a perspective view of the line spread control device, this device being shown in its operative condition in this figure.

Figure 8 is a view similar to Fig. 7, but showing means provided by the present invention for rendering the line spread control device inactive and, in effect, setting it at the zero setting.

Figure 9 is a detail view in top plan of the control shaft for the quadding and centering mechanism, showing the latch for releasably holding it in its different settings.

Figure 10 is a perspective view of a portion of the assembling elevator of the line casting machine, showing the manner in which a matrix is assembled in the matrix line at an upper level during the composition of the line.

Figure 11 is a perspective view of a portion of the line delivery channel of the line casting machine, showing means responsive to the presence of a matrix at the upper level in the matrix line for tripping the mechanism which trips the control latch for the control shaft of the quadding and centering mechanism.

Figure 12 is an elevation of the mechanism responsive to a control matrix in a matrix line for automatically tripping the control latch for the control shaft for the quadding and centering mechanism, the parts being shown in full lines in the positions which they assume after being tripped, and the parts about to be restored to normal position during the return travel of the line delivery slide.

Figure 13 is a view similar to Fig. 12, but showing in full lines the tripping mechanism as blocked from operation, and showing in dotted lines this mechanism in its un-blocked condition.

Figure 14 is a perspective view, showing part of the means for controlling the blocking means for the tripping mechanism.

Figure 15 is a perspective view of other parts of the controlling means for the blocking means.

Figure 16 is a top plan, partly in section, showing means for controlling the assembly of a matrix at the upper level in the matrix line, and for controlling the blocking means for the mechanism which trips the control latch for the control shaft of the quadding and centering mechanism.

Figure 17 is a detail vertical section, taken on the line 17—17 in Fig. 16.

Figure 18 is a detail side elevation, showing the restoring arm on the control shaft resting on its stop at the "Center" setting of the control shaft and the cooperative latch on the first elevator at the point where this latch is about to restore the control shaft from its "Center" to its "Flush left" setting.

Figure 19 is a view similar to Fig. 18 but showing the restoring arm on the control shaft restored to "Flush left" setting.

Figure 20 is a detail plan view, showing the relative positions of the control arm on the control shaft and its latch when the control shaft is in the position shown in Fig. 19.

Figure 21 is a view similar to Fig. 18, but showing the stop for the restoring arm in its inactive position and the control shaft restoring arm in its "Flush right" setting.

Figure 22 is a view similar to Fig. 21, but showing the restoring arm in full lines in its "Center" position, and indicating by dotted lines the overmotion of the restoring arm as the setting of the control shaft is changed from "Flush right" to "Center."

Figure 23 is a view similar to Fig. 20, but showing the relative positions of the control arm on the control shaft and the cooperating latch while the restoring arm is in the position indicated by the dotted lines in Fig. 22.

Figure 24 is a detail view, partly in vertical section, showing the latch on the first elevator partly deflected as it passes the restoring arm during the descent of the first elevator.

The invention is shown applied in the present instance to quadding and centering mechanism similar to that disclosed in Patent No. 1,970,527, as modified in some respects substantially as shown in Patent No. 2,081,866 hereinbefore referred to, and to which reference is made for a detailed disclosure of the construction and operation of such quadding and centering mechanism. For the purposes of the present invention, it may be explained that 1 represents the usual vise frame in the upper portion or cap of which the right hand and left hand vise jaws 2 and 3 respectively are mounted slidably for movements toward and from one another by suitable actuating mechanism which comprises a vise jaw closing lever 4 operable periodically by a spring 4a controlled by a cam on the usual main cam shaft of the machine of the class hereinbefore referred to, this lever being operatively connected to a reciprocatory jaw operating rack bar 5. This rack bar is provided with means, such as a bolt 6 which is slidable transversely in the right hand vise jaw block, and a controlling lever 7 which is pivoted on the right hand vise jaw block by a pivot pin 7a, for connecting and disconnecting this rack bar with respect to the right hand jaw 2 or to the vise frame. The bolt 6 is operable by the lever 7, while the right hand jaw is in its fully open position against its stop 2a, to engage one end of the bolt 6 in a notch 6a in the rack bar 5 when moved in one direction, and to engage its other end in a notch 6b in the top of the vise frame when the bolt is moved in the opposite direction.

A rack bar 8, similar and parallel to the rack bar 5, is connected to the left hand vise jaw 3, and a coupling pinion 9, fixed to the lower end of a shaft 10 rotatable and movable vertically in a bearing 11 on the top of the vise frame, is engageable with the rack bars 5 and 8 to connect the left hand jaw to the right hand jaw and to the jaw closing lever 4 when this pinion is set in an appropriate position for centering, or to connect the left hand jaw alone to the jaw operating lever 4 while the right hand jaw is disconnected from the rack bar 5 and bolted to the vise frame.

A shaft 12 is mounted rotatably on and extends across the top of the vise frame and has a crank 13 fixed thereon, this crank having a pin 14 thereon which is engageable in a recess 15 in one end of a lever 16, the latter being pivoted at 17 on the bearing 11 and provided at its other end with a pin 18 which engages in a circumferential groove in the upper portion of the shaft 10. While the pinion 9 is in its raised position, it is disengaged from at least one of the rack bars, and the right hand jaw 2, is bolted to the rack bar 5, and may be moved inwardly by the jaw closing lever 4 toward the left hand jaw 3 while the latter rests against the left hand jaw closing device 19 such as that shown in U. S. Patent No. 1,108,750, dated August 25, 1914, and which, in machines of this class is usually adjustable for different desired line measures or column widths. This jaw closing device is operable during the first and second justifications, as usual in machines of this class, by upward movements of a link 19a under the influence of a tension spring 19b and controlled by a cam on the main cam shaft of the machine, to close the left hand vise jaw against a matrix line between the jaws.

While the pinion 9 is in its lowered position, it couples together the rack bars 5 and 8, and if the right hand jaw is connected to the rack bar 5 by the bolt 6, operation of the jaw closing lever 4 in the appropriate direction will move both jaws inwardly or toward one another equidistantly and simultaneously, or will retract both jaws and thereby space them apart to receive a matrix line between them; and if the right hand jaw is unbolted from the rack bar 5, the left hand jaw alone may be moved inwardly toward the right hand jaw while the latter is held in its full line position by engagement of the bolt 6 with the vise frame.

The bolt 6 is operated by an arm 250 fixed to the shaft 12 to rotate therewith, the outer end of this arm being engageable in and disengageable from a notch 252 in a bar 254 which is mounted slidably at one end of the cap of the vise frame and carries a pin 256 which engages in a fork 258 in the adjacent end of the lever 7 when the right hand jaw is in its full line position. The arm 250 is swingable, when the shaft 12 is rotated in one direction, in the notch 252 to move the bar 254 in a direction to withdraw one end of the bolt 6 from the notch 6b in the vise frame and to engage the other end of this bolt in the notch 6a in the rack bar 5, thereby connecting the right hand jaw to the rack bar 5 for operation thereby, and the arm 250 is swingable out of the notch 252 by further rotation of the shaft 12 in said direction, as shown in Fig. 4, leaving the bolt 6 engaged in the notch 6a in the rack bar 5, and the arm 250 is swingable by rotation of the shaft 12 in the opposite direction to engage in the notch 252 in the bar 254 and is operable to shift the bolt 6 to disengage it at one end from the notch 6a in the rack bar 5 and to engage its other end in the notch 6b in the vise frame, as shown in Fig. 5, thereby disconnecting the right hand jaw from the rack bar 5 and locking it in its full line position to the vise frame.

The jaw operating rack bar 5 is held from operation by the jaw closing lever 4 until the first elevator has lowered a matrix line between the vise jaws and in front of the mold, by a latch 260 (Fig. 4) the lower end of which is engageable in a notch 262 in the top of the rack bar 5, this latch having a cross arm 266 at the top which is pivotally connected at one end by a pivot pin 268 to a bridge 286 secured to the top of the vise frame and said cross arm is pivotally connected at its other end by a pivot pin 270 to one end of a trip arm 272 having a finger 274 at its other end which extends into a position to be engaged and depressed by a jaw of the first elevator when the latter seats on the top of the vise frame. The trip arm 272 is provided with a fulcrum pin 276 on which a bearing block 278 is mounted rotatably, and this block engages in an inclined groove 280 in a fulcrum block 282 which is slidable on the top of the vise frame. When the jaw of the first elevator descends upon and depresses the finger 274, the trip arm 272 rocks on its fulcrum pin 276 in a direction to raise the pivot pin 270, thereby raising the adjacent end of the cross arm 266 of the latch and swinging the latch upwardly about its pivot 268 and disengaging the lower end of the latch 260 from the notch 262, the rack bar 5 being thereby released for operation by the spring-loaded operating arm 4. The fulcrum block 282 is mounted on a bar 284 secured adjustably to the top of the vise frame whereby adjustment of the fulcrum block having the inclined groove therein will adjust the height of the fulcrum pin 276 and thereby adjust correspondingly the height of the release finger relatively to the height of first elevator when its descends to different casting levels.

The shaft 12 is provided with a knob 20 which is fixed thereon for rotation of this shaft manually into its different selected positions, and this knob is provided with a pointer 21 which cooperates with an indicator plate 22 fixed to the top of the vise frame, the indicator plate being provided with suitable indicia designating the different positions in which the shaft 12 is set. For example, the indicator plate may bear the indicia "Flush left" with which the pointer 21 registers when the shaft 12 has been rotated into the position in which the coupling pinion 9 is raised and disengaged from the rack bar 5 and the bolt 6 connects the rack bar 5 with the right hand jaw 2; the indicia "Center" in which the pointer 21 registers when the shaft 12 is in the position in which the coupling pinion 9 is lowered and couples together the rack bars 5 and 8 and the jaw bolts 6 connects the rack bar 5 to the right hand jaw; and the indicia "Flush right" with which the pointer 21 registers when the shaft 12 is in the position in which the bolt 6 locks the right hand jaw in full line open position while the coupling pinion 9 remains in its lowered position and couples together the rack bars 5 and 8, the pin 14 on the crank, during rotation of the shaft 12 into the last mentioned position, riding out of the recess 15 in the lever 16 and resting against the lower edge thereof to hold the pinion in its lowered position.

The indicia "Flush left" designates the setting of the quadding and centering mechanism in which the right hand vise jaw is unbolted from the vise frame and is bolted to the operating lever 4 for movement thereby toward the left hand jaw to close against a matrix line composed with spacebands to a length sufficient to permit spreading thereof to full line measure by expansion of the spacebands therein during justification, or a short line, with or without spacebands, as a line at the end of a paragraph, to quad out the blank or unfilled remainder of such a line at its right hand end. At this setting of the mechanism, the slugs or reproductions from short matrix lines and also matrix lines of full line measure will be flush at the left hand side of a column, as the left hand jaw at this setting is uncoupled from the rack bar 5 and rests against the jaw closing device 19 which determines the line measure for which the jaws are set.

The indicia "Center" designates the setting of the quadding and centering mechanism for centering matrix lines which are shorter than full line measure, both jaws being then coupled together by the pinion 9 for simultaneous and equidistant movement toward one another and against the ends of the matrix line by the operating lever 4, and the right hand jaw being unbolted from the vise frame, the equal inward movements of the jaws causing them to center the line and to close the ends of the mold not closed by the matrices in the line, so that the type bars or slugs cast from such a line will be blank equidistantly at both ends.

The indicia "Flush right" designates the setting of the quadding and centering mechanism in which the right hand jaw is unbolted from the rack bar 5 and bolted to the vise frame so that this jaw will be locked against its stop 2a in full line position while the pinion 9 is lowered and couples together the rack bars 5 and 8, the left hand jaw alone then being connected to the jaw closing lever 4 so that it may move the left hand jaw toward the right hand jaw. At this setting of the mechanism, all slugs cast from the matrix lines will be flush at the right hand side of the column, although the left hand jaw may move inwardly to close against a matrix line which is short or indented at the left-hand end, and thereby close the left hand end of the mold not closed by matrices in the line.

The justification means shown is similar to that commonly used on machines of this class and disclosed in Patent No. 1,970,527 hereinbefore referred to, it comprising a pair of justification rods 51 and 52 having the justification bar 29 connected pivotally to their upper ends, the rods being raised respectively by the usual first and second justification levers operative from the main cam shaft of the machine and acting on the collars 53 and 54 on the rods 51 and 52 respectively to push up the justification bar 29 pivotally connecting the upper ends of the rods 51 and 52 to expand the spacebands in the line clamped between the vise jaws.

The quadding and centering mechanism is shown applied to a typographical machine provided with a line spread control device whereby lines containing the usual expansible spacebands, if composed to a length shorter than full line measure by not more than a predetermined amount, will be spread or expanded to full line measure during justification, but if composed to a length shorter than full line measure by more than such predetermined amount, will be quadded out automatically while the quadding and centering mechanism is in the "Flush left" setting, and the present invention provides means for automatically rendering such line spread control means inactive while the quadding and centering mechanism is in its "Center" setting for centering, or "Flush right" for flush right.

The line spread control device shown in the present instance is substantially in accordance with that disclosed in Patent No. 1,970,528 hereinbefore referred to, and it may be described briefly as comprising a jaw rack pawl 23 which is pivotally connected at 24 to an arm 25 which latter is pivotally connected at 26 to the lower portion of the vise frame and has a cam 27 on its upper end which is engageable by a roller 28 on the justification bar 29 of the justification mechanism. The pawl 23 has teeth 30 on its upper edge which are engageable with teeth 31 on the lower side of the rack bar 5 under the action of a spring 32 interposed between the cam 27 and an arm 23a on the pawl 23, but the pawl 23 is restrainable from such engagement by a step 33a on a block 33 which is fixed to the vise frame and with which a step 34 on the pawl 23 cooperates until immediately after the usual first justification takes place, whereupon the step 34 passes off the step 33a. A line spread control pawl 35 provided with a land 35a on its upper side and a recess 35b adjacent thereto is pivoted at 36 to a side of the rack bar 5, and has a flange 37 on its lower side which is arranged to slide in a groove 37a in a bracket 38 fixed to the pawl 23. The spring 32 acts to lift the pawls 23 and 35, and to engage the teeth on the pawl 23 with teeth on the rack bar 5.

A latch 56 as disclosed in Patent No. 2,081,866 hereinbefore referred to is pivoted on the vise frame at 57 and has a lug 56a thereon at one end adapted to wedge, under the action of a spring 55, against a block 58 fixed to the arm 25 during justification to assist the cam 27, then engaged by the roller 28, in holding a line tightly between the vise jaws. After the cast has been made and the slug is broken away from the matrix line, the justification bar 29 descends and relaxes the wedging engagement of the latch 56 on the block 58, and the latch 56 is rocked by a roller 59 on the jaw closing device 19 to retract the jaw rack pawl 23 from the rack bar 5 and unlock the arm 25 so that it may return to its normal position under the action of its spring 25a.

The line spread control device is provided with means for predetermining the amount by which a line is shorter than full line measure or column width in order to restrain the pawl 23 from engagement with the rack bar 5 and thereby permit the right hand jaw to move back against its usual fixed line measure stop 2a and allow the line to be spread or expanded to full line measure during justification, or to permit the pawl 23 to engage the rack bar 5 and effect automatic quadding of the right hand end of the line by the right hand vise jaw, such means comprising, in the construction shown, a pendant lever 40 which is pivotally suspended by a pin 41 from a side of the bearing 11 on the top of the vise frame and carries a block 42 at its lower end, this block being above and in the same vertical plane with the line spread control pawl 35. The block 42 is adjustable, by the pendant lever 40 when swung about the pivot pin 41, in the direction of movement of the rack bar 5, and is adapted to be set in different adjusted positions in said direction by a pin 43 against which the lever 40 rests normally, this pin being fixed to a downward extension 44 on a slide 45 which latter is mounted slidably on the top of the vise frame for adjustment in the direction of movement of the rack bar 5, and is provided with a longitudinal slot 46 through which screws 47 threaded into the bearing 11 extend for clamping the slide 45 in different set positions.

The justification or the quadding of a line depends upon the relationship between the set position of the block 42 and the line spread control pawl 35, when the first justification is about to occur. In order to facilitate the setting of the block 42, a scale 48 is provided on a lateral extension 49 of the bearing 11 and cooperates with a pointer 50 on the slide 45 to indicate the settings of this slide. The scale is graduated preferably from zero to 3 ems, thus allowing a matrix line composed to a length shorter than full line measure by an amount not greater than, for example, 3 ems, or any other amount indicated by the scale and pointer, will be expanded or spread by the spacebands therein to full line measure during justification, but a matrix line which is shorter than full line measure by more than the amount indicated by the scale and pointer will be quadded automatically at the right hand end by the right hand jaw. The arrangement of the line spread control device is such that while the block 42 bears on the land 35a of the pawl 35, the upward movement of the justification bar 29 during first justification to expand the spacebands in a line of sufficient length to be spread or expanded by the spacebands therein will expand such a line to full line measure because during the closing movement of the right hand jaw against a line of such length the land 35a on the pawl 35 will not move beyond the block 42 while the lever 40 rests against its stop 43, and this block therefore will hold down the pawls 35 and 23, so that the pawl 23 will be prevented from engaging its teeth with teeth on the rack bar 5. Consequently, the right hand jaw can then move back against its usual fixed line measure stop 2a under the expansion of the spacebands in the line. A line too short to be spread or expanded to full line measure by the spacebands therein will be quadded automatically at its right hand end, because the land 35a on the spread control pawl 35 will then move, during the closing movement of the right hand jaw against such a short line, beyond and clear of the block 42, which will then be received by the recess 35b in the control pawl 35 thereby freeing the spread control pawl 35 for upward movement under the influence of the spring 32, and will allow the pawl 23 to swing upwardly to engage its teeth with teeth on the rack bar 5, thereby locking the right hand jaw against such a short line for casting and quadding out the right hand end of the line.

The present invention provides means for automatically rendering the line spread control device ineffective and, in effect, to set it at its zero setting when the control shaft 12 is rotated from its "Flush left" position to its "Center" or "Flush right" position. This is necessary in centering matrix lines to enable lines to be centered without limitation as to their length within full line measure for which the vise jaws are set, because the setting of the line spread control device, while effective, governs the inward or line closing movement of the right hand jaw according to whether or not the lines are filled sufficiently to spread or expand to full line measure by expansion of the spacebands therein, but in centering the lines, the left hand jaw moves inwardly the same distance as the right hand jaw, and if the line spread control device were effective during centering, then only matrix lines which are short by twice the amount for which the line spread control device is set could be centered automatically. However, with the line expansion spread control device rendered ineffective, or in effect, set at zero, all lines to be centered are placed under the immediate control of the centering mechanism.

The means for automatically rendering the line spread control device ineffective when the shaft 12 is set in the "Center" or "Flush right" position comprises, in the present instance, an arm 60 fixed to and projecting laterally from a side of the lever 16 and engageable with a pin 61 fixed to and projecting laterally from an extension 62 of the pendant lever 40 at one side of its pivot 41, a tension spring 63 connecting the pin 61 with a pin 64 projecting laterally from the lever 16 and acting to return the pendant lever 40 and the block 42 thereon to normal position and resting against the stop pin 43, as shown in Fig. 7. Rotation of the shaft 12 from its "Flush left" setting to its "Center" or "Flush right" setting causes the crank 13 thereon to rock the lever 16 in a direction to cause descent of the arm 60 thereon into engagement with and to depress the pin 61 on the pendant lever 40, thereby swinging the pendant lever from normal position shown in Fig. 7 to the position shown in Fig. 8. The lever 40 is thereby carried away from its stop pin 43 and the lower corner of the block 42 is brought into a position to be received in the recess 35b in the control pawl 35, this recess when opposite to the corner of the block 42 while the lever 40 is swung away from its stop pin 43 being in a position corresponding to zero setting of the line spread control device and to the position occupied by the rack bar 5 corresponding to the full line position of the right hand jaw.

By this construction, when the control shaft 12 is rotated to "Center," the block 42 is automatically swung into a position where it will permit the pawl 35 to rise freely under the influence of the jaw rack pawl 23 and its spring 32 so that jaw rack pawl 23 may engage its teeth with the teeth on the rack bar 5.

With the mechanism set in "Center," when a matrix line is lowered by the first elevator into position between the vise jaws, the latch 260 is tripped by a jaw of the first elevator as the matrix line reaches its fully lowered position. The spring-loaded jaw closing lever 4 then operates to close the vise jaws against the ends of the matrix line. The justification cycle is then initiated, and upward movement of the roller 28 on the justification bar 29 acts on the cam 27 on the arm 25 to shift the pawl 23 to only the small extent necessary to carry the step 34 on said pawl out of engagement with the step 33a, thereby permitting the spring 32 to rock the pawl 23 to contact its teeth immediately with teeth on the rack bar 5. Further upward movement of the roller 28 causes it to act on the cam 27 to fully engage its teeth with teeth on the rack bar 5, thereby locking the vise jaws. Immediately after the pawl 23 is engaged with teeth on the rack bar 5, the lug 56a of the latch 56 locks over the block 58, where it is retained until the slug cast in the mold is broken away from the matrix line.

After completion of justification and of the casting cycle, the roller 59 on the vise closing device 19 is rocked down against the adjacent end of the latch 56, thereby relieving its hold on the block 58 and retracting the pawl 23 from engagement with the rack bar 5. The pawl 23 may then be restored by retraction of the cam 25 to the position where the step 34 is beneath the step 33a on the block 33. The length of the lines which may be centered, therefore, will not be limited by the line spread control device set at zero.

The shaft 12 may be rotated from "Center" to "Flush left" for matrix lines to be composed for justification to full line measure by the spacebands in the lines as controlled by the line spread control device hereinbefore described, and for automatic quadding out the right hand ends of lines which are shorter by a predetermined amount than full line measure as hereinbefore described, such rotation of the shaft 12 swinging the crank 13 and lever 16 to lift the arm 60 from the pin 61 and allow the spring 63 to assist gravity in returning the pendant lever 40 and the block 42 thereon to normal position with the lever 40 resting against the stop pin 43, and concurrently causing the lever 16 to raise the pinion 9 to uncouple the rack bars 5 and 8, the bolt 6 maintaining the connection of the right hand jaw to the rack bar 5 for operation by the jaw closing lever 4; or the shaft 12 may be rotated from "Center" to "Flush right" for matrix lines composed to full line measure or lines which are to be flush at their right hand ends or right hand side of a column and quadded at the left hand ends of the lines or left hand side of a column, the pin 14, during rotation of the shaft 12 to this setting, riding on the underside of the lever 16 and thereby retaining the pinion 9 in its lowered position and in coupling engagement with the rack bars 5 and 8 so that the left hand jaw may be moved inwardly against the ends of such lines, but the lever 7 will be operated to retract the bolt 6 to disconnect the right hand jaw from the rack bar 5 and to bolt the right hand jaw to the vise frame so that this jaw will remain in full line position against its fixed stop 2a. The shaft 12 may also be rotated directly from its "Flush left" setting to its "Flush right" setting, or vice versa, to control the vise jaws at these settings, as hereinbefore explained. These various settings of the quadding and centering mechanism may be performed manually by operation of the knob 20 which is connected to this shaft.

The present invention provides means whereby the settings of the quadding and centering mechanism from "Flush left" to "Center," from "Flush left" to "Flush right" and from "Center" to "Flush right" are controlled automatically by the composed matrix lines, and more specifically by an element of the matrix line, preferably according to the level or height at which it is assembled in the composed line.

Such automatic control means is shown applied to a typographical machine of the class referred to, in which 70 represents the usual assembling elevator which has a horizontal channel extending across the top thereof for the assembling of the matrices therein during the composition of the matrix lines. The channel has a lower rail 71 therein on which matrices M may be assembled in the line at the usual lower level, they being supported on this rail by resting of their front lower lugs m thereon, and this channel has an upper or so-called duplex rail 72 which is above the lower rail and on which matrices may be assembled in the line at an upper level, or in a raised position relatively to the matrices assembled on the lower level, they being supported at the upper level by resting of their front lower lugs m on the rail 72 while the matrix line is being composed and delivered from the assembling elevator. Such lower and upper rails are usually employed in the assembling elevators of typographical machines of the class referred to for composition of two-letter matrices having the characters from which slugs are to be cast located at different heights on each of the matrices, as for the casting respectively of characters having different type faces, as for example, the usual light type faces from matrices assembled at the lower level, and bold-face, italic or other special type faces from matrices assembled at the upper level. The assembling elevator is mounted for vertical movement on the machine, and while in its lower position, receives the matrices at its right hand end from the usual assembler entrance, to which the matrices are delivered from the matrix magazine under control of the usual keyboard K, and the assembling of the matrices in the assembling elevator at the lower or upper level during composition of a line is controlled by the position of the upper or duplex rail 72. This rail is shown for this purpose in the present instance as slidable endwise in the assembling elevator by a bell crank 73 pivoted at 73a on the front thereof so that the end of this rail adjacent to the matrix receiving end of the channel in the assembling elevator may be normally retracted from that end of this channel and held in such retracted position by a spring 74, at which setting the matrices will assemble at the lower level, but may be extended against the action of this spring toward the matrix entrance end of the channel to intercept the falling matrices and cause them to assemble on this rail at the upper level. Fig. 1, for example, shows a matrix line in the assembling elevator in which some of the matrices are assembled at the lower level and other matrices in the line are assembled at the upper level. The lever 73 which sets the duplex rail is actuated by a vertically movable link 75 to which it is pivotally connected.

The matrix line, after its composition in the assembling elevator, is lifted thereby to an upper position level with a delivery channel 76 which, as usual in machines of this class, has a matrix channel 77 provided with rails 78 and 79 to receive respectively the supporting lugs on the matrices assembled in the assembling elevator at the lower and upper levels and thereby maintain the matrices at the level or levels at which they were assembled. The matrix line is delivered from the assembling elevator to the delivery channel by the usual delivery slide 80, the short finger 81 of which occupies a position to receive the matrix line from the assembling elevator, and which pushes the line into and through the delivery channel into the usual jaws of the first elevator which lowers the line to the vise jaws in front of the mold, as usual and well known in line casting machines of the class referred to.

The facilities existing in typographical machines of the class referred to for assembling matrices at different levels in the composition of matrix lines are utilized according to the present invention for automatically controlling the quadding and centering mechanism such as that herein shown and described. In the embodiment of the invention herein shown, the front wall 85 of the delivery channel 76 is provided with a device which is actuated in response to the passage therethrough of a matrix line having a matrix therein which occupies the upper level, and is therefore in a raised position relatively to the lower position. This device comprises preferably a finger 86 which is connected to or forms a part of a lever 87 which is pivoted, as by a screw 88, on a bracket 89 fixed to the front wall of the delivery channel, the finger projecting through a slot 90 in said front wall into the matrix channel 77 in a plane to be engaged by a matrix at the upper level in the line but not by a matrix at the lower level therein as the line is advanced through this channel, and this finger projects into the channel 77 to an extent sufficient to be engaged and actuated preferably by the front lower lug m on a matrix which is at the upper level in this channel. The inner end of this finger is bevelled or rounded, so that this finger will be deflected outwardly from the channel as the front lower lug m on a matrix assembled at the upper level passes it. The lever 87 which carries this finger is provided with a tension spring 91 which is connected to said lever and the front wall 85 of the delivery channel, and it acts to yieldingly hold the inner end of the finger 86 in the path of the front lower lug on a matrix assembled in a composed matrix line at the upper level, but permitting the finger to be deflected by the passage of such lug on a raised matrix as the matrix line is advanced in the line delivery channel.

The shaft 12 for setting the quadding and centering mechanism has an arm 100 fixed thereto and to which a spring 101 attached to the vise frame is connected, this spring acting to rotate the shaft 12 from the "Flush left" position to the "Center" or "Flush right" position, but which is controlled by an arm 102 which is fixed to the shaft 12, and by a cooperating latch 103. This latch is pivoted at 104 to the bridge 286 fixed to the top of the vise frame and is held yieldingly against a side of the arm 102 by a tension spring 106 attached at one end to this latch and at its other end to the bridge 286. The side of the latch 103 which engages the arm 102 is provided with a pair of notches 107 and 108, either of which is adapted to receive the adjacent edge of said arm, the notch 107 being so positioned that when the arm 102 is engaged therein, as shown in full lines in Fig. 9, the shaft 12 will be held in the "Flush left" position against the action of the spring 101, and when engaged in the notch 108, as shown in dotted lines in said figure, will be held in the "Center" position against the action of said spring. The notched edge of the latch beyond the notch 108 is provided with an un-notched surface 109 which will engage and be held against the arm 102 under the action of the spring 106 when the shaft 12 is rotated into the "Flush right" position. The tooth 110 which divides the notches 107 and 108 is bevelled or curved as shown to present a cam surface to the arm 102 while it is between the notches 107 and 108, and will retract the latch when force is applied to the shaft 12 to rotate it from "Center" to "Flush left," and the un-notched surface 109 on the latch will permit the shaft 12 to be rotated from "Flush right" through "Center" past the tooth 110 to "Flush left," such rotations of the shaft 12 being performed as hereinafter described.

Assuming the quadding and centering mechanism occupies the "Flush left" setting, when the latch 103 is tripped and the arm 102 on the shaft 12 is released, this shaft is rotated by the spring 101 from the "Flush left" setting. Means is provided for selectively arresting such rotation of this shaft at either its "Center" setting or at its "Flush right" setting, such means comprising in the present instance a stop 100a which is pivoted on the front of the vise frame beneath the arm 100 on the shaft 12 and rotatable into one position as shown in full lines in Fig. 1 to stop the rotation of this arm when the shaft 12 has been rotated to its "Center" setting, or this stop may be turned aside about its pivot into the dotted line position shown in that figure, where it will be out of the path of the arm 100 and thus permit the shaft 12 to be rotated by the spring 101 past its "Center" setting and into its "Flush right" setting.

Means is provided for restoring the shaft 12 automatically from its "Center" to its "Flush left" setting, or from its "Flush right" setting to its "Center" setting or to its "Flush left" setting during the ascent of the first elevator, which is slidable vertically on the front of the vise frame and is usually employed in line casting machines of this class for receiving the matrix lines from the delivery channel and lowering them to a position between the vise jaws and in front of the mold for casting, and for elevating the matrix lines after each cast for removal from the first elevator and distribution of the matrices. Such restoring means as shown comprises a return bar 201 which is pivoted in a slot 202 in a bracket 203 fixed to the slide of the first elevator, and a lug 204 which is adapted to be fixed removably on the return bar as by a set screw 205. The return bar normally rests by gravity in the bottom of the slot 202 so that it projects laterally from the first elevator slide 200. If the shaft 12 is at its "Center" or "Flush right" setting, and it is desired to change to the "Flush left" setting, the lug 204 is applied to and secured on the return bar 201, and as the first elevator ascends after the cast to its upper position for removal of the matrix line therefrom, the lug 204 engages beneath and passes the arm 100, and as it cams past this arm it swings this arm upwardly. The shaft 12 is thereby rotated to an extent to restore this shaft to its "Flush left" setting, and if the shaft 12 is set for "Flush right" and it is desired to restore it to its "Center" setting, the lug 204 is removed from the return bar 201, this bar will then directly engage and cam past the arm 100 and in doing so, will swing this arm upwardly and rotate the shaft 12 to bring it to its "Center" setting. Since the return bar 201 rests by gravity on the bottom of its slot 202, it will occupy its extended position during the ascent of the first elevator but will be deflected upwardly to clear the arm 100 during the following descent of the first elevator, as illustrated in Fig. 24.

Assuming the shaft 12 is in its "Center" setting, as shown in Fig. 18, and that the lug 204 is on the return bar 201, ascent of the first elevator will bring the lug 204 into engagement with the lower side of the arm 100, and as the ascent of the first elevator continues, the lug 204 will swing the arm 100 unwardly from its "Center" position toward its "Fush left" position, causing the arm 102 on the shaft 12 to leave its dotted line position in the notch 108 in the latch 103 and move toward the full line position shown in Fig. 9, and in doing so, to cam against the tooth 110 of the latch 103, forcing the latch aside. In order to assure seating of the arm 102 in the notch 107 of the latch 103, the lug 204 is of such dimensions that as it passes the edge of the arm 100 it imparts a slight over-motion thereto which carries the arm 102 to the position shown in Fig. 20, and as the lug 204 continues its ascent past the arm 100, it allows the arm 100 to return to its "Flush left" position and causes the arm 102 on the shaft to seat in the notch 107, as shown in Fig. 9, corresponding to the "Flush left" setting of the shaft 12.

Assuming that the shaft 12 is in its "Flush right" setting, with the lug 204 on the return bar 201, as indicated by the dotted lines in Fig. 21, and the arm 102 on the shaft 12 engaging the plain or un-notched surface 109 on the latch 103, and it is desired to return the shaft to "Flush left" setting, as shown in Fig. 19, the ascent of the first elevator will bring the lug 204 into engagement with the arm 100, and as the ascent of the first elevator continues, the lug 204 will swing the arm 100 upwardly past the "Center" setting, camming the arm 102 on the shaft 12 past the tooth 110 and into engagement with the notch 107, as just described.

Assuming the shaft 12 is in its "Flush right" setting, and it is desired to change the setting thereof to "Center," the lug 204 is removed from the return bar 201, and as the first elevator ascends, the bar 201 directly engages the restoring arm 100, and as the ascent of the first elevator continues, the bar 201 will swing the arm 100 upwardly past the "Center" setting to the dotted line position indicated in Fig. 22, and in so doing, the arm 102 is shifted past the notch 108 and cams against the tooth 110 to rock the latch 103 into the position shown in Fig. 23. Continued ascent of the first elevator will carry the bar 201 past the arm 100, which will release this arm and the shaft 12 and will permit the arm 102 on said shaft to return to and seat in the notch 108, which will hold the arm 102 in the "Center" setting, corresponding to the position of the arm 100 as shown in full lines in Fig. 22. During this operation, the swing of the arm 100 by the return bar 201 is limited to return of the shaft 12 to its "Center" setting because of the increased radial distance from the center of the shaft 12 to the vertical plane of the camming surface of the bar 201, which will permit the bar 201 to strip off the end of the arm 100 before the arm 102 has reached the notch 107 for the "Flush left" setting.

The latch 103 is tripped to release the arm 102 under control of the lever 87 in response to the outward deflection of its finger as by a matrix assembled at the upper level in the matrix line as such line is advanced through the delivery channel 77. The tripping means comprises a lever 111 which is pivoted intermediately of its ends on the front wall 85 of the delivery channel 76 by a pivot screw 112 and is biassed by a tension spring 113 toward a stop 114 fixed in the front wall of the delivery channel, and a latch 115 pivoted on a screw 116 on a lug 117 fixed on the wall 85 and having a hook 118 arranged to engage the upper edge of the lever 111 and thereby restrain this lever against the action of its spring 113. The lever 87 is provided at its end remote from the finger 86 with a fork 119 which straddles a projection 120 on the latch 115 below its pivot. While the lever 87 occupies its normal position with its finger 86 projecting into the path of a lug on a matrix at the upper lever in the delivery channel, the latch 115 will be held in its latched engagement with the lever 111 under the action of the spring 91, as shown by the full lines in Fig. 13, but when the finger 86 is deflected outwardly by the lug on a matrix assembled at the upper level as such a matrix is advanced through the delivery channel, the lever 87 will retract the latch 115 as shown by the dotted lines in Fig. 11 and thereby release the lever 111 for actuation by its spring 113, and the lever 111 will then swing down at its end remote from the latch and will come to rest against its stop 114, as shown in Fig. 12.

The end of the lever 111 which engages the stop 114 has a fork 111a thereon in which a pendant trip lever 121 is pivoted intermediately of its ends by a pivot pin 122, the trip lever being thus supported for swinging movement in a vertical plane. A tension spring 123 is attached at one end to the lever 121 and at its other end to the lever 111, biassing the lever 121 toward an upright position, and the lever 121 is supported by the lever 111 so that it may be raised and lowered thereby.

While the lever 121 is in its raised position (Fig. 13), its lower end is at a level above and is swingable clear of an upward projection 124 on the latch 103, and when the lever 121 is lowered, as shown in Fig. 12, its lower end will be at a level below and in a position to engage the projection 124 and to actuate the latch 103 in a direction to retract it from and to release the arm 102 on the shaft 12 so that the latter may rotate under the action of the spring 101 (Fig. 1).

The pendant trip lever 121, while it occupies its lowered position, will be actuated to trip the latch 103 by a downward extension 125 carried at the forward end of an arm 126 of the line delivery slide when the delivery slide has made its matrix line delivery stroke and has delivered the line to the jaws of the first elevator, as indicated by the full and dotted lines in Fig. 12, to trip the latch 103 to release the shaft 12. The lever 111 will be reset to its normal position, to be held in such position by the latch 115, by a portion of the arm 126 of the line delivery slide, which is offset rearwardly from the downward extension 125 thereon, during the return movement of the said slide, the lever 111 having a pawl 127 pivoted thereon by a screw 128 and having a bevelled surface 129 on its upper end, and being held yieldingly by a tension spring 130 connecting it and the lever 111, in an upright position against a stop 131 where its bevelled surface 129 on its upper end will be in the path of travel of the arm 126 in rear of the downward extension 125 on the line delivery slide, riding of the arm 126 on the bevelled surface 129 on the pawl 127 during the return travel of the line delivery slide deflecting the respective end of the lever 111 downwardly into re-latching engagement with the latch 115. During the line delivery travel of the slide 80, the arm 126 thereon merely deflects the pawl 127 away from its stop and against the action of its spring 130 without affecting the position of the lever 111.

Means is provided by the present invention for blocking the lever 111 from operation in the event the composed matrix line contains matrices such as italic, bold face or other matrices, some or all assembled at the upper level but which line is not to be centered. This blocking means comprises a blocking detent 140 which is pivoted at 141 on the front wall 85 of the delivery channel and is connected to a tension spring 142 attached to the wall 85, the upper end of this detent having a hook 143 thereon which is adapted to engage over the end of the lever 111 while the latter is engaged and held by the latch 115, as shown by the full lines in Fig. 13 whereby the lever 111 will be restrained from actuation by its spring 113, even though the latch 115 may be retracted from engagement therewith.

When a matrix line is to be centered, the detent 140 is held in retracted position, as shown by the dotted lines in Fig. 13, with its hook 143 clear of the end of the lever 111 to permit operation thereof to cause tripping of the latch 103, by a pawl 147 which is pivoted at 148 on the front wall 85 of the delivery channel. This pawl has a shoulder 149 against which the end of an arm 150 on the detent 140 may abut to hold the detent 140 in retracted position with its hook 143 clear of the adjacent end of the lever 111, as shown in Fig. 12, the lever 111 being then releasable by the latch 115, but when a line is composed with one or more or all of its matrices therein assembled at the upper level and such a line is not to be centered, the pawl 147, prior to release of the lever 111 by retraction of the latch 115, is swung from its restraining position where it is held by its weighted end 155, against the action of its weighted end, into a position to displace its shoulder 149 from the end of the arm 150 on the detent 140 and thereby permit the arm 150 to drop into a recess 151 in the pawl 147 adjacent to the shoulder 149 thereof, the detent 140 being then free to be swung by its spring 142 from the dotted line position to the full line position shown in Fig. 13, thereby bringing the hook on the upper end of the detent into position over the adjacent end of the lever 111 while the latter is held by the latch 115, and holding the lever 111 from operation. The lever 111 will then remain in its normal inactive position with the pendant trip lever 121 in raised position and its lower end will be above the level of the projection 124 on the latch 103, when the pendant lever 121 is swung by the extension 125 on the delivery slide during its line delivery travel, so that the arm 102 on the control shaft 12 will not be released. Consequently, the quadding and centering mechanism will not be set in line centering position but will remain in its normal "Flush left" setting.

The pawl 147 is swung into position to permit the dent 140 to block operation of the lever 111 preferably by a part on the assembling elevator and which is operated as the latter is raised to elevate the matrix line to the line delivery slide, such part comprising in the present instance a pawl 160 which is pivoted to the front of the assembling elevator by a pivot screw 161 to swing edgewise in a space between the front of the assembling elevator and a cover plate 162 secured to the front of the assembling elevator, whereby the upper end of this pawl may swing outwardly from a side of the assembling elevator and its lower end may swing inwardly under the influence of a tension spring 163 one end of which is connected to a pin 164 fixed to the pawl 160 and the other end connected to a pin 165 fixed to the cover plate 162. The movement of this pawl 160 under the influence of the spring 163 is limited by a stop pin 166 fixed in the cover plate, but is controlled by a latch 167 having its upper end turned forwardly to provide a fulcrum which bears against the rear side of the cover plate 162, a compression spring 168 encircling a screw 169 which passes loosely through the latch 167 and is threaded into the cover plate and bearing against the rear side of the latch 167 to press the lower portion of this latch yieldingly against the rear side of the cover plate 162. Normally, the lower portion of the latch 167 will be held by the spring 168 against the rear side of the cover plate 162 and the lower end 169 of the pawl 160 will abut edgewise against it under the action of its spring 163, the latch 167 being held from edgewise displacement by a guide saddle 170 which is secured to the back of the cover plate. The lower end of the latch 167 is displaceable rearwardly from the cover plate, and when so displaced, it will move out of the path of and free the lower end of the pawl 160 so that it may swing inwardly toward the assembling elevator at its lower end and outwardly at its upper end, as shown by the full lines in Fig. 14.

A link 175 is pivotally connected at its upper end as at 176 to the pawl 147, and this link is guided for endwise movement by a pin 177 which is secured in the front wall 85 of the delivery channel and operates in a slot 178 in the link, the pin 177 being so placed that the lower end of the link will be in the path of the upper end of the pawl 160 when the latter is released and the assembling elevator is raised to lift the matrix line to the delivery channel. The link 175 will be thereby pushed upwardly and will swing the pawl 147 about its pivot 148 from the position in which it holds the detent 140 in inactive position, as shown in Fig. 12 to the position shown in full lines in Fig. 13, in which it frees the arm 150 and allows the detent to swing its hook 143 into blocking engagement with the lever 111 which at this time will be held by the latch 115. When the assembling elevator descends, after delivery of a matrix line therefrom to the delivery channel, the pawl 160 is automatically returned to inactive position, as by a pawl 180 which is pivoted at 181 on a bracket 182 which may be fixed to the lower end of the delivery channel (Fig. 1), this pawl being so weighted as to rest normally by gravity in its operative position against a stop 183 on the bracket 182, in which position a bevelled surface 184 adjacent to the upper end of the pawl 160 will ride on the pawl 180, and thereby push the upper end of the pawl 160 inwardly, where it will clear the pawl 180, and retracting the lower end 160a of the pawl 160 from in front of the latch 167, whereupon the spring 168 will return this latch to edgewise abutting relation with the lower end of the pawl 160. During the ascent of the pawl 160 while swung outwardly from the side of the assembling elevator into a position to engage the lower end of the link 175, the end of the pawl 180, which will be in the path of the upper end of the pawl 160, will swing upwardly idly so that it will not obstruct the ascent of the pawl 160.

A link 190 pivotally connected at 191 to the pendant trip lever 121 and having a screw 192 clamped adjustably in a slot 193 in the other end of this link to abut against a pivot screw 194 secured in the detent 140, serves automatically to restore the detent 140 to disengaged relation with the lever 111 by the tilting of the trip lever 121 when actuated by the line delivery slide in advancing a line of matrices to the first elevator, thereby placing the mechanism in condition for centering matrix lines. The detent 140 is disengaged from the lever 111 by tilting of the trip lever 121 by the line delivery slide as it delivers the matrix line to the first elevator, by pushing the link 190 to bring the screw 192 into engagement with the pivot screw 104, the screw 192 being set in adjusted position along the slot 193 to a position where it will effect such disengagement when the delivery slide has fully delivered the matrix line to the first elevator. As the detent 140 is disengaged from the lever 111, the arm 150 is withdrawn from the recess 151 in the pawl 147, which then gravitates to the position shown in Fig. 12 where the end of the arm 150 abuts against the step 149.

The latch 167 which controls the pawl 160 is displaced from abutting relation with the lower end of said pawl by a finger 195 which is movable laterally from an inactive position to an operative position relatively to the latch 167, as indicated by the full and dotted lines in Fig. 15, and is reciprocable rearwardly to engage the latch 167 and to push it rearwardly out of the path of the lower end 160a of the pawl 160, thereby releasing this pawl for movement under the action of its spring 163 to project its upper end into position to engage and actuate the link 175 in the manner hereinbefore described.

The finger 195 is shown for this purpose in the present instance as having its body portion 196 fixed, as by screws 197, to a rod 198 which is slidable longitudinally and rotatable in the front and rear walls of a box-like bracket 199 which is pivotally suspended by a shaft 199a from a yoke-shaped support 210 fixed to a side of the lever 211 at the left hand side of the keyboard K so that it may swing laterally of this lever to set the finger 195 in active and inactive relation with the latch 167. A compression spring 198a serves to return the finger 195 to its normal position after each actuation. The weight of this bracket and its parts is so distributed that it will be normally suspended by gravity in a substantially upright position with the finger 195 in alinement with the latch 167. An arm 212 projects laterally from the bracket 199 into a position to be engaged and depressed by an arm 213 fixed to the link 75 which is pivotally connected to and extends downwardly from the lever 73 which controls the duplex rail 72, whereby the bracket 199 will be tilted to carry the finger 195 into inactive relation with the latch 167 when the link 75 is moved downwardly to set the duplex rail in active position for matrix assembly thereon at the upper level, but when the link 75 moves upwardly and while it is in its upper position, and the duplex rail 72 is retracted for assembly of matrices on the lower rail at the lower level, the arm 213 will be above the arm 212 on the bracket 199, and the latter will swing by gravity to upright position, with the finger 195 in position to trip the latch 167 when the finger 195 is moved rearwardly.

The lever 211 which carries the bracket 199 is similar to that usually employed in typographical machines of the class referred to for raising the assembling elevator to elevate the matrix line to the line delivery slide, and for lowering it to the line assembling level, it being connected at its rear end to the assembling elevator by a link 214. This lever is fixed to a shaft 215 which extends across the front of the keyboard K and is rotatable in bearings 216 on the keyboard frame, this shaft being operable manually by a handle 217 which is fixed thereto. The pivotal connections of the links 214 and 75 to the lever 211 are such that the duplex rail will be restored to its inactive position upon each descent of the assembling elevator.

The present invention provides means whereby the blocking detent, as well as the operation of the keyboard for selection of the matrices, the setting of the duplex rail for assembling matrix lines in which some or all of the matrices are assembled on the upper level, and the raising and lowering of the assembling elevator may be controlled either manually, or automatically by a tape mechanism such as the "Teletypesetter" shown conventionally at 218 in which the tape 219 is provided with appropriate code perforations as disclosed for example in U. S. Patents Nos. 2,006,860, dated July 2, 1935, and 2,090,654, dated August 24, 1937. Since such perforated tape mechanism is well known and per se forms no part of the present invention, such mechanism is not illustrated and will not be herein described in detail, reference being made to said patents for a disclosure of such mechanism.

For the purposes of the present invention, it is believed to be sufficient to explain that the link 75 which controls the setting of the duplex rail 72 is pivotally connected at 220 to a T-shaped or bell-crank lever 221 which is pivotally mounted by a pivot screw 222 to the lever 211, and to which a pair of parallel bars 223 and 224 are pivotally connected at their rear ends, and these bars are pivotally connected at 225 and 226 respectively to a lever 227 which is pivotally connected by a pivot screw 228 to the assembling elevator lever 211 so that the upper and lower bars 223 and 224 operate in parallelism but in relatively reverse directions. The lever 227 which swings forwardly or rearward on its pivot 228 serves as manual means for operating the upper and lower bars 223 and 224, and it is provided with a pin 229 which is engageable in a forward notch 230 of a detent 231 when the lever 227 is swung to its forward position for setting the duplex rail 72 for the assembly of matrices at the lower level on the lower rail, and is engageable with a rear notch 232 when swung to its rear position to advance the duplex rail for the assembly of matrices on the duplex rail at the upper level, such forward or rearward movements of the lever 227 acting through the upper and lower bars 223 and 224 to rock the bell-crank lever 221 upwardly or downwardly respectively to raise or lower the link 75 and so control the duplex rail. The detent 231 is pivoted on the assembling elevator raising and lowering lever 211 by a pivot screw 233, and a tension spring 234 connecting this detent with said lever serves to yieldingly retain the pin 229 on the lever 227 in one or the other notch in this detent, although permitting disengagement of the pin 229 therefrom upon the application of sufficient force. The lever 227 thus provides means for manually setting the duplex rail for assembling of matrices at the lower or the upper level, and if the blocking catch 140 is to be used to prevent centering of a line, the rod 198 may be pushed rearwardly manually to cause the finger 195 to trip the latch 167 and thereby release the pawl 160 to render the detent 140 active to block operation of the lever 111.

In employing a tape mechanism, such as the "Teletypesetter" for automatically controlling the setting of the duplex rail and the blocking device, the forward ends of the upper and lower bars 223 and 224 are arranged for actuation by the upper rail push bar lever 240 and the lower rail push bar lever 241 respectively of the "Teletypesetter" mechanism which, as well known, are controlled by code perforations in the tape 219. The rod 198 which operates the finger 195 is also arranged to be engaged and pushed rearwardly by an extension on the lower rail push bar lever 241 of the usual "Teletypesetter" mechanism when said lever is actuated. The assembler elevator may also be raised and lowered automatically under control of code perforations in the tape 219, as in the "Teletypesetter" mechanism, by means disclosed in the aforementioned Patent No. 2,006,860, to which reference is made for an understanding of such assembling elevator raising and lowering means.

The construction and operation of the elements of the control means having been hereinbefore described in detail, the general operation of the machine embodying such control means is as follows:

In order to set the machine for matrix lines which are to be assembled at the usual lower level and which are to be flush at the left hand side of a column, the control shaft 12 occupies its "Flush left" setting, and the duplex rail 72 occupies its normal retracted position, the lever 227 occupying its forward position, as shown in Figs. 1 and 17, so that all of the matrices will assemble in the assembling elevator at the usual lower level. If the matrix lines are composed to a length not shorter than full measure by an amount predetermined by the setting of the line spread control slide 45, as for example 3 ems, such lines may be spread or expanded to full line measure during justification by expansion of the expansible spacebands in the line, but if the line is shorter than full line measure by such predetermined amount, as occurs at the end of a paragraph, such a line will be automatically quadded out at its right hand end and will be flush at the left hand side with the composition of full measure lines.

In order to change the setting of the machine from "Flush left" to "Center" for centering the lines automatically, the stop 100a is set beneath the arm 100, and the duplex rail is shifted toward the matrix receiving end of the matrix channel in the assembling elevator by downward movement of the link 75, either manually by shifting the lever 227 rearwardly or by operation of the upper rail push bar lever 240 of the tape controlled mechanism, which shifts the upper bar 223 rearwardly, to assemble a matrix on the duplex rail at the upper level at an appropriate point in the composition of the line.

Upon completion of composition of the matrix line in the assembling elevator, the latter is raised, by operation of the lever 211, to elevate the matrix line to the level of the line delivery channel and for transfer to the line delivery slide 80 which, thereupon in machines of this class, is automatically operated to advance the composed matrix line through the delivery channel. When the lower lug on the matrix which was assembled on the duplex rail at the upper level, and occupies a raised position in the line, engages the finger 86 on the lever 87, it deflects this finger outwardly from the line delivery channel, and in so doing, rocks the lever 87 about its pivot 88 from the full line position to the dotted line position shown in Fig. 11, causing the fork 119 on the end of this lever which engages the lower end of the latch 115 to rock this latch in a direction to disengage and release the lever 111. The detent 140 being then retracted, the lever 111 then rocks about its pivot 112, under the action of its spring 113, in a direction to lower the pendant trip lever 121 so that its lower end is in a position to engage the upward projection 124 on the latch 103 which normally holds the shaft 12 at its "Flush left" setting. As the line delivery slide 80 advances the matrix line through the delivery channel, the extension 125 on this slide engages the upper end of the pendant trip lever 121 and swings it from the full line position to the dotted line position shown in Fig. 12, and thereby rotates the latch 103 from the full line position to the dotted line position shown in Fig. 9, releasing the arm 102 on the shaft 12 which latter then rotates under the action of the spring 101 until the arm 100 thereon engages the upturned stop 100a (Fig. 18), thus stopping the rotation of the shaft 12, whereupon the extension 125 on the line delivery slide is retracted from the upper end of the trip lever 121 upon the return of the delivery slide, the quadding and centering mechanism being then set in its "Center" position. During the return of the line delivery slide, the arm 126 thereon actuates the pawl 127 to re-set the lever 111 and to re-engage it with the latch 115, and lifting the trip lever 121 so that its lower end is above the level of the upturned lug 124 on the latch 103.

Rotation of the shaft 12 from "Flush left" to "Center" position does not operate the lever 7 (Fig. 4) so that the rack bar 5 remains connected to the right hand vise jaw 2, but such rotation of the shaft 12 does rock the crank 13 upwardly to rock the lever 16 in a direction to lower the pinion 9 into coupling engagement with both rack bars 5 and 8, and to operate the lever 40 to, in effect, set the line spread control at zero (Fig. 8). When the line delivery slide has pushed the matrix line into the first elevator, the latter is lowered in the usual manner by its cam on the main cam shaft in the machine and introduces the matrix line between the vise jaws and in casting position in front of the mold for the casting of a type bar or slug therefrom. As the first elevator approaches the limit of its descent to the vise cap or top of the vise frame, it trips the release latch 260 which normally locks the right hand jaw against its stop 2a (Fig. 9), and the jaw closing lever 4 then operates both rack bars to close the vise jaws against the respective ends of the matrix line. The jaws then move toward one another equidistantly, thereby centering the line in front of the mold, the ends of the mold not closed by the matrices being closed by the respective jaws, following which the cast is made against the matrix line in the manner usual in machines of this type. After the cast has been made, the line closing device 19 releases the endwise pressure on the matrix line, and the first elevator ascends to its upper level where the matrix line carried thereby is transferred therefrom for distribution to the magazine, as usual and well known in machines of this class, and lever 4 operates to return the vise jaws to their fully open positions. During the ascent of the first elevator to transfer position, the return bar 201 with the lug 204 thereon engages the arm 100 on the shaft 12 and rotates this shaft to return the mechanism to "Flush left" setting, and the return of the delivery slide will reset lever 111, as previously described.

If a line is to be centered which is composed with some of the character bearing matrices at the upper level and others at the lower level, or is composed with all of the matrices therein at the upper level, the operation will be as just described, except that the leading matrix on the upper level will trip the finger 86 to release the latch 115 and initiate the succeeding operations, as previously described.

If a line is composed which contains mixed character bearing matrices, or matrices some of which are assembled at the lower level and other matrices such as bold face or italic face characters, are assembled at the upper level but such a line is to be cast "Flush left," the detent 140 is set in position to block operation of the lever 111. Such setting of the detent 140 may be effected by pushing rearwardly the rod 198 manually or by tape controlled operation of the lower rail push bar lever 241, as previously described, thus preventing the mechanism from going to "Center."

If the duplex rail 72 happens to be in position to assemble a matrix at the upper level when the finger 195 (Fig. 15) is to be operated to set the blocking detent 140 in blocking engagement with the lever 111, it will be necessary to first return the duplex rail to its retracted position, either manually by pulling the lever 227 forwardly, which will push the lower rail push bar 224 rearwardly and thereby lift the arm 213 on the link 75 from the arm 212 on the bracket 199 and allow this bracket to swing into upright position with the finger 195 in alinement with the latch 167, and then pushing the rod 198 rearwardly, thereby causing the finger 195 to release the latch 167 from the pawl 160 (Fig. 14), or by two successive tape controlled operations of the lever 241 in a direction to push the lower rail push bar 224 rearwardly, the first of these actuations of the bar 224 restoring the duplex rail to its retracted position and pushing the bracket 199 rearwardly although the finger 195 will then pass to one side of the latch 167 without actuating it because the bracket 199 will then be in its tilted position, but as the rod 198 returns to its forward position, the finger 195 and its carrying bracket 199 will swing into upright position, with the finger 195 alined with the latch 167, and the second or subsequent actuation of the rod 198 will cause the finger 195 to engage and trip the latch 167, thereby releasing the pawl 160 so that it may assume the position to actuate the link 175 which controls the blocking detent 140. After the cast, this detent is restored to inactive position, as previously described.

The control mechanism provided by the present invention is also capable of controlling the setting of the quadding and centering mechanism from "Flush left" to "Flush right" or from "Center" to "Flush right" by assembling a matrix at the raised or upper level in a matrix line.

In order to change the setting from "Flush left" to "Flush right," at which latter setting all slugs cast from the lines will be flush at the right hand side of the column, the stop 100a is swung aside or into the dotted line position shown in Figs. 1, 21 and 22, and the duplex rail 72 is set in its operative position to assemble a raised matrix at the upper level in the line during its composition. When a matrix line so composed is advanced through the delivery channel, the lower lug on the raised matrix will release the lever 111, and trip the latch 103, thereby releasing the arm 102 on the shaft 12, as previously described, but the shaft 12 will then rotate, under the action of the spring 101, from the "Flush left" setting, past the "Center" setting, to the "Flush right" setting because the stop 100a is inactive. As the shaft 12 rotates to the "Flush right" setting (Fig. 21), the lever 7 operates the bolt 6 to disconnect the right hand jaw 2 from the rack bar 5 and to lock it to the vise frame and hold it against its stop 2a, but the pinion 9 will be lowered to couple together the rack bars 5 and 8 so that the left hand jaw 3 will be connected for operation by the jaw closing lever 4. When the line is delivered to the first elevator, the latter is set into operation as usual in machines of this class, and will lower the line into position between the vise jaws, and the jaw closing lever 4 will then operate to close the left hand jaw against the matrix line, quadding out the line at its left hand end if the matrix line is short of full line measure. After the cast has been made from the line, the first elevator ascends, lifting the line for transfer therefrom and distribution of the matrices therein to the magazine, and during this ascent of the first elevator, the lug 204 on the bar 201 will engage the arm 100 on the shaft 12 and rotate this shaft back to its "Flush left" setting (Fig. 19) as previously described.

If the quadding and centering mechanism is set with the shaft 12 in its "Center" position and it is desired to automatically change the setting to "Flush right" and to return to "Center," the stop 100a must be in its inactive position as in Figs. 21 and 22, the lug 204 removed from the bar 201, and the duplex rail 72 set in its operative position to assemble a raised matrix at the upper level at a suitable point in the line during its composition. Assuming the shaft 12 is set at "Center," the arm 102 thereon will be engaged in the notch 108 in the latch 103, as indicated by the dotted lines in Fig. 9. As the matrix line with a raised matrix therein is advanced through the line delivery channel, the lower lug on the raised matrix will engage the inner end of the finger 86, and will trip the latch 115 and release the lever 111, which will thereupon lower the trip lever 121, and during the delivery of the line to the first elevator, the lever 121 will trip the latch 103, thereby releasing the arm 102 and allowing it to come to rest against the plain or un-notched portion 109 of the latch 103, and allowing the arm 100 to go from "Center" (Fig. 22) to "Flush right" (Fig. 21). The jaw operating lever 4 then operates to close the left hand jaw against the matrix line, after which the first elevator ascends, as previously described, but during the ascent of the first elevator, the bar 201 itself, from which the lug 204 has been removed, engages the arm 100 on the shaft 12 and thereby restores this shaft to its "Center" setting, the arm 102 during this restoring operation riding on the plain or un-notched portion 109 on the latch 103 and thereby allowing the arm 102 to enter the notch 108, where it will be held.

When it is desired to set matrix lines for mixed composition while the quadding and centering mechanism is in the "Center" setting, the control from the keyboard will be the same as for mixed composition at the "Flush left" setting of the mechanism.

The pawl 160 is set to trip the blocking detent 140, either by manual operation of the lever 227 or by the tape controlled operation of the lower rail push bar lever 241, preferably at the start of the composition of the matrix line if it is then known that use of the blocking detent will be necessary, but this setting operation may be performed at any time during the composition of the matrix line and prior to the ascent of the assembling elevator, and the detent will not be released to its blocking position until the assembling elevator is raised to elevate the line to the delivery slide. Therefore, although the composition of a line may have been commenced while the quadding and centering mechanism is in one of its settings, its setting may be changed prior to the raising of the assembling elevator. For example, if a line is being composed with matrices at the usual lower level setting and a matrix is assembled at the upper level in the line, and it is desired that such a line not be centered, the tripping means for the blocking detent may be set to release this detent and thereby block the mechanism which would otherwise change to the setting of the quadding and centering mechanism under control of the matrix assembled at the upper level in the line.

The element of the composed matrix line which is employed to control automatically the tripping of the control shaft of the quadding and centering mechanism has a portion thereof positioned to trip the control shaft by the line as it is advanced toward the vise jaws, and is preferably a blank matrix or an appropriate character bearing matrix which is assembled at the upper level or in a raised position relatively to matrices assembled in the matrix line at the usual lower level during the composition of the line, as hereinbefore described. Such a controlling matrix, whether a blank matrix or a character bearing matrix, may be stored in the matrix magazine in the machine and delivered therefrom to the assembling elevator for assembling in the matrix line like other matrices, either by manual operation of the keyboard, as usual in line casting machines of the class hereinbefore referred to, and which is convenient to the operator of the machine occupying his usual position at the keyboard, or such a controlling matrix may be delivered from the matrix magazine to the assembling elevator under control of suitable code perforations in a tape controlled mechanism such as that hereinbefore referred to. The controlling matrix, whether a blank matrix or a character bearing matrix, is preferably provided with the usual distributor teeth, as shown, whereby it may be distributed and returned to the appropriate channel in the matrix magazine after the cast from the line and while the other matrices in the line are being distributed.

It will be understood that when a perforated tape controlled mechanism is employed in conjunction with the quadding and centering mechanism, the tape for such tape controlled mechanism may be provided with code perforations for controlling not only the selection and delivery of the matrices from the magazine in the machine for assembly in the line, the setting of the duplex rail for controlling the assembling of the matrices on the upper or the lower level, and the raising and lowering of the assembling elevator, as usual in such tape controlled mechanism, but the tape for such mechanism may obviously be provided with such additional code perforations as may be needed to control the blocking detent.

The uses of features of the automatic quadding and centering mechanism provided by the present invention, and its advantages, may be summarized as follows:

In using such mechanism, no thought need be given by the operator to other controls after the composed matrix line leaves the assembling elevator. The element of the line for controlling centering or flush right, as the case may be, can be introduced into the line at any time before the assembling elevator is raised; or, if a raised element exists in a line and it is desired to block resultant quadder action, the blocking means can be set up at any time prior to the raising of the assembling elevator.

It is possible to have three successive matrix lines completely assembled and at various stages of progress through the machine, with any desired function of justifying, quadding flush left, or centering (with the indicator set at "Flush left") for each individual line under complete control. This is because no change of control is necessary for justifying or flush left, and the control for centering (or flush right, as the case may be), if any, operates while the line passes through the delivery channel, while any desired blocking action occurs as the assembling elevator rises. Hence if one line were casting, one line were waiting in the delivery channel and one line completely assembled in the assembling elevator, each line could control the automatic quadding and centering mechanism, individually and automatically.

The automatic control action of the line spread device makes further consideration of line spread unnecessary on any line entering the casting cycle, once the predetermined amount of spread at "Flush left" has been determined.

Where automatic control of the keyboard is utilized, as in "Teletypesetter" operation, lines can be quadded "Flush left," or lines with a raised element can be centered automatically without the necessity of additional code perforations in the tape. The latter is especially advantageous on bold face centered lines such as are commonly used in newspaper columns.

If it is desired to center a line the characters of which are composed entirely in the lower position, a blank matrix is inserted in the line in the raised position to actuate the centering mechanism, either at the beginning or end of a line, or between two words where it will serve as a spacer. If used at the beginning or end of a line, another blank in the regular lower position at the opposite end will keep the line in perfect center position.

When using automatic operation, only one additional code perforation is needed ahead of a raised element in the line to block a line with raised elements from centering. The perforation which results in such blocking action can occur any time before the assembling elevator is raised, as long as the duplex rail is then set for assembling matrices in the lower position.

Continuous casting of lines in the "Center" setting of the mechanism is possible, without regard to whether matrices assemble in lower or upper position, by releasing latch 103 so the pointer 21 will indicate "Center," and throwing the return bar 201 (after removing lug 204) on the first elevator to its inactive position toward the center of the first elevator slide, where it will clear the restoring arm 100.

Lines may be cast continuously in the "Flush right" setting of the mechanism without regard to upper or lower position of the matrices by taking the steps just outlined for centering, and setting the stop 100a clear of arm 100, and releasing latch 103 so the pointer 21 will indicate "Flush right."

While the invention has been shown and described in sufficient detail to enable those skilled in the art to understand the same, it is to be expressly understood that various changes and modifications may be made therein without departing from the inventive concept underlying the same. Therefore, the invention is not to be limited except insofar as expressed in the appended claims.

We claim:

1. In a typographical machine, the combination with a pair of matrix line receiving jaws, means for composing a matrix line with elements thereof assembled therein at relatively different levels, means for advancing such composed matrix line to the jaws, and mechanism selectively settable to move one or both jaws against an end or the ends of a matrix line positioned between the jaws, of means operable selectively by an element at only one of said levels in the matrix line and by the advance of the line to set said mechanism for movement of one or both jaws against a matrix line.

2. In a typographical machine, the combination with a pair of matrix line receiving jaws, means for composing a matrix line with elements thereof assembled therein at upper and lower levels, means for advancing such a composed matrix line to the jaws, and mechanism selectively settable to move one or both jaws against a matrix line positioned endwise between the jaws, of means operable by a portion of an element of the matrix line at the upper level only and operative by the advance of such line for controlling the setting of said mechanism.

3. In a typographical machine, the combination with a pair of matrix line receiving jaws, an assembling elevator for composing a matrix line with matrices assembled therein at different levels and for elevating the composed line, means for advancing the elevated line, and mechanism selectively settable to move one or both jaws against an end or the ends of a matrix line positioned between the jaws, of means operative by an element of the matrix line at the upper level therein and by the advance of the line to change the setting of said mechanism, and means including a selectively settable member on the assembling elevator operative by elevating movement of the assembling elevator for blocking a change in the setting of said mechanism.

4. In a typographical machine, the combination with a pair of matrix line clamping jaws, means for advancing a composed matrix line to the jaws for reception between them, said line having an element thereof which is distinguished from other elements thereof, and mechanism selectively settable to move one or both jaws against an end or the ends of such a matrix line positioned between the jaws, of means acting on said mechanism to change it from one to another of its settings, means for releasably retaining said mechanism at one of its said settings, and means operative by said distinguished element of the line and by the advance of the line to trip said retaining means and thereby permit a change from one to another of said settings of said mechanism.

5. In a typographical machine as defined in claim 4, including means selectively operable to block the operation of said tripping means.

6. In a typographical machine, the combination with a pair of matrix line clamping jaws, an assembling elevator for composing a matrix line with elements thereof assembled at different levels and for elevating the composed line, a delivery channel to receive the elevated line, means for advancing the elevated line through the delivery channel toward the jaws, and mechanism selectively settable to move one or both jaws against an end or the ends of a matrix line positioned between the jaws, of a member positioned for actuation by only an element at the upper level in the line and by the advance of the line through the delivery channel, and means controlled by said member for governing the setting of said mechanism.

7. In a typographical machine as defined in claim 4, wherein said member comprises a finger positioned at a level in the delivery channel for engagement and deflection by a lower lug on only an element at the upper level in the line.

8. In a typographical machine, the combination with a pair of vise jaws for clamping a matrix line endwise between them, a line delivery channel, assembling means selectively settable for assembling matrix lines having elements thereof at upper and lower levels therein, a delivery slide for advancing a matrix line through said channel toward the vise jaws, mechanism including a control member settable selectively for moving one or both jaws against an end or the ends of a line positioned between the vise jaws, of means acting on said control member to change the setting thereof from one to the other of its settings, a latch for restraining said member, and means including a tripping member for said latch in the path of the delivery slide and positioned in response to only one of said settings of the assembling means to trip the latch by the delivery slide during the line advancing movement thereof.

9. In a typographical machine as defined in claim 8, wherein said tripping member for said restraining latch comprises a part on the line delivery slide and is operative to release said control member during the line advancing movement of the line delivery slide.

10. In a typographical machine as defined in claim 8, including an actuating member for tripping said latch, and means on said line delivery slide for operating said actuating member during the line advancing movement of the line delivery slide.

11. In a typographical machine as defined in claim 8, including an actuating member for tripping said latch, a latch controlling said actuating member, means movable with the line delivery slide for operating said actuating member to trip said latch during the line advancing movement of the delivery slide, and means movable with the line delivery slide for restoring said actuating member to engagement by its controlling latch during the return movement of the delivery slide.

12. In a typographical machine, the combination with a pair of vise jaws for clamping a matrix line endwise between them, an elevator to receive a matrix line and present it between the vise jaws, and mechanism including a control shaft selectively settable to move one or both jaws against a matrix line between the jaws, a spring acting on said control shaft to change the setting of said mechanism from an initial setting to another setting, a latch cooperative with the control shaft for holding it in said initial setting against the action of said spring, means for tripping said latch to release said control shaft for rotation, a restoring arm on the control shaft, stop means engageable by the restoring arm for arresting rotation of the control shaft under the action of said spring at said other setting of said mechanism, and means operative by movement of the elevator for rotating the control shaft to restore said mechanism to the initial setting and for returning the control shaft to cooperation with said latch.

13. In a typographical machine, the combination with a pair of vise jaws for clamping a matrix line endwise between them, an elevator to receive a matrix line and present it between the vise jaws, and mechanism including a control shaft selectively settable to move one or the other jaw against an end of a matrix line between the jaws or to move both jaws against the ends of such matrix line, a spring acting on said control shaft to set said mechanism for movement of one or the other jaw or to set said mechanism for movement of both jaws, a latch cooperative with said shaft for controlling its rotation under the action of said spring, means for tripping said latch for rotation of the control shaft under the action of said spring to change said mechanism from one to another of said settings, a radial restoring arm on the control shaft, stop means engageable by said restoring arm for arresting rotation of the control shaft under the action of said spring in changing from one to another of said settings of said mechanism, and means carried by said elevator and movable past the end of said radial restoring arm for rotating the controlling shaft to cooperation with said latch and to restore said mechanism to its initial setting.

14. In a typographical machine as defined in claim 13, wherein said radial restoring arm is swingable in an arc, and said stop means is positioned to be engaged by said arm at a position which is intermediate of its swing and corresponds to one setting of said mechanism, and said stop means is movable into an inactive position to permit said radial restoring arm to swing past said intermediate position to another position which corresponds to another setting of said mechanism.

15. In a typographical machine as defined in claim 13, wherein said radial restoring arm is swingable in an arc from an initial position corresponding to the setting of said mechanism for movement of one of said jaws to an intermediate position corresponding to the setting of said mechanism for movement of both of said jaws, and said stop means is positionable to be engaged by said radial restoring arm to arrest the swing thereof at said intermediate position or in an inactive position to permit further swing of said radial restoring arm to a third position corresponding to the setting of said mechanism for movement of the other of said jaws, and wherein said restoring means carried by said elevator comprises a bar on said elevator which is movable by ascent of said elevator into the arc of swing of said radial restoring arm and is engageable therewith to swing it from said third position to said intermediate position.

16. In a typographical machine as defined in claim 13, wherein said radial restoring arm on said control shaft is swingable in an arc under the action of said spring from an initial position corresponding to the setting of said mechanism for movement of one of said jaws, and said stop means is settable to arrest the swing of said arm in an intermediate position corresponding to the setting of said mechanism for movement of both of said jaws, or is settable in an inactive position for further swing of said arm to a third position corresponding to the setting of said mechanism for movement of the other of said jaws, and wherein said restoring means carried by said elevator comprises a bar movable by said elevator while moving in one direction through the arc of swing of said radial restoring arm and is engageable therewith to swing it from said third position to said intermediate position, and an auxiliary member attachable to said bar and cooperable with said radial restoring arm to swing it from said intermediate position to said initial position, or from said third position past said intermediate position and to said initial position.

17. In a typographical machine as defined in claim 16, wherein said bar and said auxiliary member when attached thereto are movable in intersecting paths relatively to the path of swing of said restoring arm and have a camming action on the end of said radial restoring arm in passing it during movement of said elevator in one direction.

18. In a typographical machine as defined in claim 17, wherein said bar is mounted pivotally on said elevator to swing in its plane of movement by said elevator for deflection into inactive position by engagement with said radial restoring arm during movement of the elevator in the opposite direction.

19. In a typographical machine, the combination with assembling means selectively settable for assembling matrix lines having elements thereof at upper and lower levels therein, a pair of vise jaws for clamping matrix lines endwise between them, a rotatable control member, mechanism selectively settable by rotation of said control member into one position to move one of the jaws toward the other jaw to close against matrix lines of different lengths or settable by rotation of said control member into a second position to move both jaws toward one another to close against and center short matrix lines, justifying means for expanding spacebands in the matrix lines, and a line spread control device operable to permit the jaw selected for movement by the rotation of said control member to said one position to assume its full line position for justification to full length, lines shorter than full length by not more than a predetermined amount but to cause said jaw to close against a line shorter than full length by more than such predetermined amount and quad out such a line by said jaw, of means responsive to only one of said settings of the assembling means to condition said control member for rotation from said one to said second position, and means operative automatically by the rotation of said control member to said second position for rendering said line spread control device inactive.

20. In a typographical machine as defined in claim 19, wherein said control member comprises a rotatable shaft, a spring acting on said shaft to rotate it from said one to said second position, and a restraining latch releasable by said means responsive to only one of said settings of said assembling means, and said selectively settable mechanism includes a jaw operating member, means controlled by rotation of said shaft into said one position for connecting one of said jaws to said operating member for closing said jaw against one end of a matrix line, and means controlled by rotation of said shaft into said second position for connecting both jaws to said operating member for movement equidistantly toward one another, and wherein said line spread control device is settable in active condition to permit justification of lines of full length or to automatically quad short lines by the rotation of said control shaft into said one position coincident with the connecting of said one jaw to said operating member, and said line spread device is settable in inactive condition by the rotation of said shaft into said second position coincident with the connecting of both jaws to said jaw operating member.

21. In a typographical machine as defined in claim 20, including a locking pawl for said jaw operating member, and wherein said line spread control device comprises a control pawl carried by said jaw operating member and controlling engagement of said locking pawl therewith, and a stop member settable at different distances graduated from zero toward the direction of jaw closing movement of said jaw operating member and cooperative with said control pawl for holding said locking pawl inactive during a predetermined jaw closing movement of said jaw operating member, said stop member being movable in the direction of jaw opening movement of said jaw operating member to its zero setting by rotation of said control shaft into position to connect both jaws for movement by said operating member.

22. In a typographical machine as defined in claim 21, wherein said control pawl on said jaw operating member is provided with a recess located therein in a position corresponding to the zero setting of said stop member relatively to said jaw operating member while the latter is in fully open jaw position, and said stop member is settable into a position to be received by said recess by rotation of said control shaft into position to connect both jaws to said jaw operating member.

23. In a typographical machine as defined in claim 22, wherein said stop member comprises a pendant lever connected to said control shaft and mounted for swinging movement thereby in the direction of jaw opening or closing movement of said jaw operating member, said pendant lever carrying a block which engages said control pawl and holds it from operation during said predetermined jaw closing movement of the jaw operating member when one of said jaws is connected to said jaw operating member, and is swung to a position to be received by said recess in said control pawl by rotation of said control shaft into position to connect both jaws to said jaw operating member.

24. In a typographical machine as defined in claim 23, wherein said means for connecting both of said jaws to said jaw operating member comprises a pinion which is shiftable axially by rotation of said control shaft, and said stop member is connected to said control shaft for operation thereby to render said line spread control device active when the control shaft is operated to shift said pinion into disconnecting relation with said jaw operating member.

25. In a typographical machine, the combination with right hand and left hand vise jaws for clamping matrix lines endwise between them, a jaw operating member, a control member movable into different positions, mechanism selectively settable by movement of said control member into one position to connect the right hand jaw to the jaw operating member for movement toward the left hand jaw, to connect both jaws to the jaw operating member for movement toward one another by movement of said control member into a second position, and to disconnect the right hand jaw from the jaw operating member and lock said jaw in its full line position while the left hand jaw is connected to the jaw operating member by movement of said control member into a third position, justifying means for expanding spacebands in the matrix lines, a line spread control device operable while said control member is set in said one position to permit the right hand jaw to assume its full line position for justification to full length lines shorter than full length by not more than a predetermined amount but to allow the right hand jaw to close against a line shorter than full length by more than such predetermined amount, means operative automatically by the movement of said control member into said second or third position to set said mechanism to move both jaws or to set said mechanism for movement of the left hand jaw alone for rendering said line spread control device inactive, assembling means selectively settable for assembling matrix lines having elements thereof at different levels therein, and means responsive to only one of said settings of the assembling means for controlling the movement of said control member from its said one position to its said second or third position.

26. In a typographical machine, the combination with a pair of vise jaws for clamping matrix lines endwise between them, means for composing matrix lines with elements thereof assembled at different levels, means for advancing such a composed matrix line toward the vise jaws, and mechanism selectively settable to move one or both of the jaws against a matrix line between the jaws, of means operable by an element of the matrix line at only the upper level therein and by the advance thereof with the line for changing the setting of said mechanism from a setting for movement of one of said jaws to the setting for movement of both jaws, a blocking device settable to block said change of setting of said mechanism, and means operable manually or by tape controlled mechanism for setting said blocking device.

27. In a typographical machine, the combination with a pair of vise jaws for clamping matrix lines between them, an assembling elevator for assembling matrix lines, including a rail settable for assembly of one or more elements of the matrix line in raised position therein, means for advancing such a matrix line from the assembling elevator, and mechanism selectively settable to move one or both jaws against the matrix line between the vise jaws, of means operative only by an element in raised position in the matrix line during its advance for changing the setting of said mechanism, a detent cooperable with said setting changing means to block such change, means for setting said detent in blocking condition, tripping means for said detent movable with the assembling elevator, and means operable manually or by tape controlled mechanism for setting said rail and for controlling said detent tripping means.

28. In a typographical machine as defined in claim 27, wherein said means for setting said detent in blocking condition comprises a detent-retaining pawl, a link for operating it to release said detent, and a pawl movable with the assembling elevator and settable selectively into active position to engage said link to trip said detent-retaining pawl to release said detent.

29. In a typographical machine as defined in claim 28, wherein said pawl movable with the assembling elevator while set in active position is engageable with said link during ascent of the assembling elevator, and including a pawl with which said pawl movable with the assembling elevator cooperates and is reset in inactive position during descent of the assembling elevator.

30. In a typographical machine as defined in claim 28, including a latch for holding said link-engaging pawl in inactive position, and wherein said means for setting said rail and for controlling said detent comprises a member carrying a reciprocatory finger and movable into one or another position to set said finger in or out of alinement with said latch, and means for moving said member to set said finger out of alinement with same latch and for setting said rail in position for assembly of matrices in raised position in the matrix line.

31. In a typographical machine as defined in claim 30, including a lever for raising and lowering the assembling elevator, and wherein said member carrying said finger is mounted pivotally on said lever to swing laterally to set said finger in or out of alinement with said latch, and has an arm projecting laterally therefrom, and said rail setting means comprises a vertically movable link having an arm thereon which engages and depresses said arm on said member to swing said finger out of alinement with said latch when said rail is set for assembly of elements in the matrix line in raised position therein.

32. In a typographical machine as defined in claim 31, wherein said finger is provided with a reciprocatory actuating rod, and said rail setting means comprises oppositely reciprocatory bars and levers for actuating the respective bars, one of said levers having an extension thereon for also operating said actuating rod for said finger.

References Cited in the file of this patent

UNITED STATES PATENTS

| | | |
|---|---|---|
| 945,892 | Woodroffe et al. | Jan. 11, 1910 |
| 990,289 | Pearce et al. | Apr. 25, 1911 |
| 1,970,527 | Sperry | Aug. 14, 1934 |
| 2,081,866 | Freund | May 25, 1937 |
| 2,153,912 | Billington et al. | Apr. 11, 1939 |